US012671560B2

(12) United States Patent
Zhang et al.

(10) Patent No.: US 12,671,560 B2
(45) Date of Patent: Jun. 30, 2026

(54) SYSTEMS AND METHODS FOR UPLINK TRANSMISSION SCHEME IN MULTI-TRP OPERATION

(71) Applicant: ZTE CORPORATION, Shenzhen (CN)

(72) Inventors: Yang Zhang, Shenzhen (CN); Zhaohua Lu, Shenzhen (CN); Bo Gao, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 245 days.

(21) Appl. No.: 18/489,588

(22) Filed: Oct. 18, 2023

(65) Prior Publication Data

US 2024/0048346 A1 Feb. 8, 2024

Related U.S. Application Data

(63) Continuation of application No. PCT/CN2021/118130, filed on Sep. 14, 2021.

(51) Int. Cl.
| | |
|---|---|
| *H04W 72/232* | (2023.01) |
| *H04L 5/00* | (2006.01) |
| *H04W 72/23* | (2023.01) |

(52) U.S. Cl.
CPC ........... *H04L 5/0094* (2013.01); *H04W 72/23* (2023.01)

(58) Field of Classification Search
CPC ... H04W 72/23; H04W 64/006; H04W 76/15; H04B 7/024; H04L 5/0044; H04L 5/0094; H04L 5/0023
See application file for complete search history.

(56) References Cited

U.S. PATENT DOCUMENTS

| | | | |
|---|---|---|---|
| 2020/0045700 A1 | 2/2020 | Sun et al. | |
| 2020/0314829 A1* | 10/2020 | Venugopal | H04W 76/11 |
| 2021/0306865 A1* | 9/2021 | Zhang | H04B 7/088 |
| 2021/0336820 A1* | 10/2021 | Lim | H04W 80/02 |
| 2022/0225298 A1* | 7/2022 | Zhang | H04L 5/0048 |

(Continued)

FOREIGN PATENT DOCUMENTS

| | | |
|---|---|---|
| WO | WO-2018/229727 A1 | 12/2018 |
| WO | WO-2019/245689 A1 | 12/2019 |

(Continued)

OTHER PUBLICATIONS

Apple Inc., "On Multi-TRP Reliability Enhancement", 3GPP TSG-RAN WG1 Meeting #106-e, R1-2107719, Aug. 27, 2021, e-Meeting (19 pages).

(Continued)

*Primary Examiner* — Andrew Lee
(74) *Attorney, Agent, or Firm* — Foley & Lardner LLP

(57) ABSTRACT

Presented are systems and methods for uplink transmission scheme in multi-transmit-receive-point (MTRP) operation. A wireless communication device can receive, from a wireless communication node, a downlink signaling comprising a field. The field can indicate whether one or two spatial relations are associated with a plurality of uplink transmissions to the wireless communication node. The wireless communication device can determine, based on the field, a transmission scheme for the uplink transmissions.

20 Claims, 10 Drawing Sheets

900

(56) References Cited

U.S. PATENT DOCUMENTS

| | | | |
|---|---|---|---|
| 2023/0041603 A1* | 2/2023 | Cirik | H04B 7/088 |
| 2023/0045623 A1* | 2/2023 | Chen | H04W 52/54 |
| 2023/0189264 A1* | 6/2023 | Choi | H04W 72/1273 |
| | | | 370/329 |
| 2023/0239870 A1* | 7/2023 | Yang | H04B 7/0634 |
| | | | 370/329 |
| 2023/0275728 A1* | 8/2023 | Chung | H04W 52/42 |
| | | | 370/329 |
| 2024/0114467 A1* | 4/2024 | Yuan | H04W 52/10 |
| 2024/0250727 A1* | 7/2024 | Muruganathan | H04B 7/065 |
| 2024/0313925 A1* | 9/2024 | Matsumura | H04L 5/0053 |
| 2024/0333369 A1* | 10/2024 | Yuan | H04L 5/0023 |

FOREIGN PATENT DOCUMENTS

| | | |
|---|---|---|
| WO | WO-2020/225692 A1 | 11/2020 |
| WO | WO-2021/050357 A1 | 3/2021 |
| WO | WO-2021/159065 A1 | 8/2021 |

OTHER PUBLICATIONS

Asia Pacific Telecom, et al., "Discussion on enhancements on multi-TRP for uplink channels", 3GPP TSG-RAN WG1 #105-e, R1-2105817, May 27, 2021, e-Meeting (7 pages).

CATT, "Enhancements on multi-TRP/panel transmission for PDCCH, PUCCH and PUSCH", 3GPP TSG RAN WG1 #106-e, R1-2106936, Aug. 27, 2021, e-Meeting (21 pages).

Futurewei, "Multi-TRP/panel for non-PDSCH", 3GPP TSG RAN WG1 Meeting #106-e, R1-2107079, Aug. 27, 2021, e-Meeting (30 pages).

Intel Corporation, "Multi-TRP enhancements for PUCCH and PUSCH", 3GPP TSG RAN WG1 #105-e, R1-2104889, May 27, 2021, e-Meeting (5 pages).

Lenovo, et al., "Enhancements on Multi-TRP for PDCCH, PUCCH and PUSCH", 3GPP TSG RAN WG1 #106-e, R1-2106667, Aug. 27, 2021, e-Meeting (17 pages).

Nec, "Discussion on multi-TRP for PDCCH, PUCCH and PUSCH", 3GPP TSG RAN WG1 #106-e, R1- 2107144, Aug. 27, 2021, e-Meeting (6 pages).

Nokia, et al., "Enhancements for Multi-TRP URLLC schemes", 3GPP TSG RAN WG1 #106-e Meeting, R1-2108053, Aug. 27, 2021, e-Meeting (21 pages).

NTT Docomo, Inc, "Discussion on MTRP for reliability", 3GPP TSG RAN WG1 #106-e, R1-2107839, Aug. 27, 2021, e-Meeting (12 pages).

Oppo, "Enhancements on multi-TRP based for PUCCH and PUSCH", 3GPP TSG RAN WG1 #105-e, R1-2104733, May 27, 2021, e-Meeting (8 pages).

Qualcomm Incorporated, "Enhancements on Multi-TRP for PDCCH, PUCCH and PUSCH", 3GPP TSG-RAN WG1 Meeting #106-e, R1-2107324, Aug. 27, 2021, e-Meeting (36 pages).

Samsung, "Enhancements on Multi-TRP for PDCCH, PUCCH and PUSCH", 3GPP TSG RAN WG1 #106-e, R1-2106866, Aug. 27, 2021, e-Meeting (18 pages).

Xiaomi, "Enhancements on Multi-TRP for PDCCH, PUSCH and PUCCH", 3GPP TSG-RAN WG1 Meeting #106-e, R1-2107894, Aug. 27, 2021, e-Meeting (20 pages).

International Search Report and Written Opinion for PCT Appl. No. PCT/CN2021/118130, mailed Jun. 20, 2022 (8 pages).

Extended European Search Report for EP Appl. No. 21956994.4, dated Oct. 2, 2024 (8 pages).

NTT Docomo Inc., "Moderator's summary for discussion [RAN93e-R18Prep-02] UL enhancements", 3GPP TSG RAN#93e, RP-211652, Sep. 17, 2021, e-Meeting (89 pages).

Office Action for KR Appl. No. 10-2024-7008613, dated Apr. 16, 2026 (with English translation, 9 pages).

Qualcomm Incorporated, "Enhancements on Multi-TRP for PDCCH, PUCCH and PUSCH", 3GPP TSG-RAN WG1 Meeting #104-e, R1-2101447, e-Meeting, Feb. 5, 2021 (28 pages).

Sharp, "Enhancements on Multi-TRP for PUSCH", 3GPP TSG RAN WG1 #105-e, R1-2105629, e-Meeting, May 27, 2021 (9 pages).

ZTE, "Enhancements on multi-TRP/Panel transmission", 3GPP TSG RAN WG1 Ad-Hoc Meeting 1901, R1-1900087, Taipei, Jan. 25, 2019 (16 pages).

* cited by examiner

400

500

600

TRP#0    — 310

610

320 —    TRP#1 uplink 0 | uplink 1 slot n    slot n+1

330

UE with
multi-panel(s)

900

1000

1010

Send a Downlink Signaling

Figure 10

SYSTEMS AND METHODS FOR UPLINK TRANSMISSION SCHEME IN MULTI-TRP OPERATION

CROSS-REFERENCE TO RELATED APPLICATION

This application claims the benefit of priority under 35 U.S.C. § 120 as a continuation of PCT Patent Application No. PCT/CN2021/118130, filed on Sep. 14, 2021, the disclosure of which is incorporated herein by reference in its entirety.

TECHNICAL FIELD

The disclosure relates generally to wireless communications, including but not limited to systems and methods for uplink transmission in a multi-TRP operation.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

Under various conventional protocols, physical uplink shared channel (PUSCH) repetition is not supported under multi-transmit receive point (TRP) based PUSCH repetition. This lack of support for multi-TRP based PDSCH repetition in PUSCH repetition can cause a bottleneck for the reliability of the whole system when multi-TRP based PDSCH repetition is adopted. Thus, in conventional systems, when a link between a user equipment (UE) and a TRP is impacted on blockage, the PUSCH repetition based on single-TRP would not be reliable, such as in 5G Frequency Range 2 (FR2). In order to enhance the robustness and reliability for PUSCH transmission, multi-TRP PUSCH transmission (e.g., uplink simultaneous transmission) is desired. A device (e.g., the UE) can be equipped/implemented/upgraded/enhanced with multiple panels to implement/utilize uplink simultaneous transmission (e.g., multi-TRP PUSCH transmission) for higher capacity.

The UE can use/leverage/utilize one or more transmission schemes for uplink simultaneous transmission across multiple UE panels and towards different TRPs. The transmission scheme can include at least Spatial Division Multiplexing (SDM), Frequency Division Multiplexing (FDM), and/or Time Division Multiplexing (TDM). As an example, in an SDM scheme, transmission layers can be subdivided into various groups with the same number of transmission layers or with different numbers of transmission layer(s) based uplink transmission. In another example, an FDM scheme can be subdivided into wide-band and sub-band precoding based uplink transmission. To leverage the uplink simultaneous transmission across multiple UE panels and to transmit the uplink transmission towards different TRPs, the UE can determine/identify/obtain/indicate at least one of the transmission schemes (e.g., SDM, FDM, or TDM) for the uplink transmission. Further, the UE can indicate the subdivision mode, including at least SDM and FDM. Thus, to enhance the robustness and reliability for PUSCH transmission, the UE can leverage one or more transmission schemes for multi-TRP PUSCH transmission.

At least one aspect is directed to a system, method, apparatus, or a computer-readable medium. A wireless communication device can receive a downlink signaling from a wireless communication node. The downlink signal can include a field indicating whether one or two spatial relations are associated with a plurality of uplink transmissions to the wireless communication node. The wireless communication device can determine, based on the field, a transmission scheme for the uplink transmissions.

In some implementations, a first bit and a second bit of the field can be indicated as "00" or "01." The wireless communication device can determine that the transmission scheme includes sending the uplink transmissions as a single uplink transmission occasion of a Transport Block (TB) using one of the spatial relations.

In some implementations, a first bit and a second bit of the field can be indicated as "10" or "11." The wireless communication device can determine that the transmission scheme includes sending the uplink transmissions as a single uplink transmission occasion of a TB using each of the spatial relations that is associated with a respective one of a plurality of groups of transmission layers. In some implementations, the wireless communication device can simultaneously send the plurality of uplink transmissions using the respective spatial relations to the wireless communication node. In some implementations, a number of the spatial relations may be 2, and a number of the plurality of groups of transmission layers may be 2. A Downlink Control Information (DCI) signaling and/or a Radio Resource Control (RRC) configuration can indicate an association between one of the spatial relations and one of the plurality of groups of transmission layers. The downlink signaling may indicate that one or more Demodulation Reference Signal (DM-RS) ports configured for the uplink transmissions are within at least two Code Division Multiplexing (CDM) groups.

In some implementations, a first bit and a second bit of the field are indicated as "10" or "11." The wireless communication device can determine that the transmission scheme includes sending the uplink transmission as a single uplink transmission occasion of a TB using each of the spatial relations that is associated with a respective one of a plurality of non-overlapping frequency domain resource allocations. The wireless communication device can simultaneously send, to the wireless communication node, the plurality of uplink transmissions using the plurality of non-overlapping frequency domain resource allocations, respectively. In some implementations, a number of the spatial relations can be 2, and a number of the plurality of non-overlapping frequency domain resource allocations can be 2. In some implementations, an association between one of the spatial relations and one of the plurality of non-overlapping frequency domain resource allocations is indicated by a DCI indication and/or an RRC configuration. In some implementations, the downlink signaling can include a higher layer parameter configured as a specific value to indicate the transmission scheme. In some implementations, the downlink signaling can indicate that one or more DM-RS ports configured for the uplink transmission are within one CDM group.

In some implementations, a first bit and a second bit of the field can be indicated as "10" or "11." The wireless communication device can determine that the transmission scheme includes sending the uplink transmission as a plurality of uplink transmission occasions of a TB using each of the spatial relations that is associated with one of the plurality of uplink transmission occasions. The plurality of uplink transmission occasions may each have a corresponding one of a plurality of non-overlapping frequency domain resource allocations. The wireless communication device can simultaneously send, to the wireless communication node, the plurality of uplink transmissions using the plurality of non-overlapping frequency domain resource allocations, respectively. In some implementations, a number of the spatial relations can be 2, and a number of the plurality of uplink transmission occasions can be 2. A DCI indication and/or an RRC configuration can indicate an association between one of the spatial relations and one of the plurality of non-overlapping frequency domain resource allocations. In some implementations, the downlink signaling can include a higher layer parameter configured as a specific value to indicate the transmission scheme. In some implementations, the downlink signaling further can indicate that one or more DM-RS ports configured for the uplink transmission are within one CDM group.

In some implementations, a first bit and a second bit of the field may be indicated as "00" or "01." The wireless communication device can determine that the transmission scheme includes sending the uplink transmissions as a plurality of slot level uplink transmission occasions of a TB using one spatial relation. A DCI indication and/or an RRC configuration can indicate an association between the spatial relation and the plurality of slot level uplink transmission occasions. The downlink signaling can include a higher layer parameter configured as a specific value to indicate the transmission scheme. The downlink signaling can indicate that one or more DM-RS ports configured for the uplink transmissions are within one CDM group.

In some implementations, a first bit and a second bit of the field can be indicated as "10" or "11." The wireless communication device can determine that the transmission scheme includes sending the uplink transmissions as multiple slot level uplink transmission occasions of a TB using a plurality of spatial relations. A number of the plurality of spatial relations can be 2. A DCI indication and/or an RRC configuration can indicate an association between one of the plurality of spatial relations and one of the plurality of slot level uplink transmission occasions. The downlink signaling can include a higher layer parameter configured as a specific value to indicate the transmission scheme. The downlink signaling can indicate that one or more DM-RS ports configured for the uplink transmissions are within at least two CDM groups.

In some implementations, a first bit and a second bit of the field can be indicated as "00" or "01." The wireless communication device can determine that the transmission scheme includes sending the uplink transmissions as a plurality of intra-slot level uplink transmission occasions of a TB using one of the spatial relations that is associated with one of the plurality of intra-slot level uplink transmission occasions. The plurality of uplink transmission occasions can each have a corresponding one of a plurality of non-overlapping time domain resource allocations. A DCI indication and/or an RRC configuration can indicate an association between the spatial relations and the non-overlapping time domain resource allocations. A number of the plurality of intra-slot level uplink transmission occasions can be 2. The downlink signaling can include a higher layer parameter configured as a specific value to indicate the transmission scheme. The downlink signaling further can indicate that one or more DM-RS ports configured for the uplink transmissions are within one CDM group.

In some implementations, a first bit and a second bit of the field are indicated as "10" or "11." The wireless communication device can determine that the transmission scheme includes sending the uplink transmissions as a plurality of uplink intra-slot level transmission occasions of a TB using one of the spatial relations that is associated with one of the plurality of intra-slot level uplink transmission occasions. The plurality of uplink transmission occasions can each have a corresponding one of a plurality of non-overlapping time domain resource allocations. A number of the spatial relations can be 2, and a number of the plurality of uplink intra-slot level transmission occasions can be 2. A DCI indication and/or an RRC configuration can indicate an association between one of the spatial relations and one of the non-overlapping time domain resource allocations. The downlink signaling can include a higher layer parameter configured as a specific value to indicate the transmission scheme. The downlink signaling further can indicate that one or more DM-RS ports configured for the uplink transmissions are within at least two CDM groups.

In some implementations, the downlink signaling at least can include a DCI indication and an RRC configuration. The RRC configuration can include a higher layer parameter configured as one of a plurality of specific values to indicate the transmission scheme. The RRC configuration can include a higher layer parameter configured as one of a plurality of specific values to indicate the transmission scheme. A first bit and a second bit of the DCI indication may be indicated as "00" or "01" to indicate the one Sounding Reference Signal (SRS) resource set is associated with the uplink transmissions. The first bit and the second bit of the DCI indication may be indicated as "10" or "11" to indicate that two SRS resource sets are associated with the uplink transmissions.

The downlink signaling at least can include a DCI indication, a Medium Access Control (MAC) Control Element (CE) activation, and an RRC configuration. The RRC configuration can include a higher layer parameter configured as one of the specific values to indicate the transmission scheme. The MAC CE activation can indicate that more than two SRS resource sets are associated with the uplink transmissions. A first bit and a second bit of the DCI indication may be indicated as "00" or "01" to indicate that one SRS resource set is associated with the uplink transmissions. The first bit and the second bit of the DCI indication may be indicated as "10" or "11" to indicate that two SRS resource sets are associated with the uplink transmissions.

In some implementations, a first bit and a second bit of the field are indicated as "10" or "11." The wireless communication device can determine that the transmission scheme includes sending the uplink transmissions as a single uplink transmission occasion of a TB using each of the spatial relations that is associated with a respective one of a plurality of groups of transmission layers. The wireless communication device can simultaneously send, to the wireless communication node, the uplink transmissions using the spatial relations, respectively. A number of the spatial relations can be 2, and a number of the plurality of groups of transmission layers can be 2. A DCI indication and/or an RRC configuration can indicate respective numbers of transmission layers within the plurality of groups of transmission layers. The RRC configuration can include a higher layer parameter to indicate the respective numbers of transmission layers within the plurality of groups of transmission layers, or a combination of the numbers of transmission layers of the plurality of groups of transmission layers. In some implementations, when the first bit and the second bit are indicated as "10," the DCI indication indicates that the respective numbers of transmission layers within the plurality of groups of transmission layers may be the same. A first SRS Resource Indicator/Transmit Precoder Matrix Indicator (SRI/TPMI) field and a second SRI/TPMI field of the DCI indication can indicate the SRS resource set configured with a lower index and the SRS resource set configured with a higher index, respectively. In some implementations, when the first bit and the second bit are indicated as "11," the DCI indication can indicate that the respective numbers of transmission layers within the plurality of groups of transmission layers are different. A first SRI/TPMI field and a second SRI/TPMI field of the DCI indication can indicate a first SRS resource set associated with higher transmission layers and a second SRS resource set associated with lower transmission layers, respectively. In some implementations, the downlink signaling further can indicate that one or more DM-RS ports configured for the uplink transmissions are within at least two CDM groups.

In some implementations, a first bit and a second bit of the field can be indicated as "10" or "11." The wireless communication device can determine that the transmission scheme includes sending the uplink transmissions as a single uplink transmission occasion of a TB using each of the spatial relations that is associated with a respective one of a plurality of non-overlapping frequency domain resource allocations. The wireless communication device can simultaneously send, to the wireless communication node, the uplink transmissions using the plurality of non-overlapping frequency domain resource allocations, respectively. A number of the spatial relations may be 2, and a number of the plurality of non-overlapping frequency domain resource allocations may be 2.

In some implementations, a DCI indication, and/or a MAC CE activation, and/or an RRC configuration can indicate whether the plurality of non-overlapping frequency domain resource allocations are based on wide-band precoding or sub-band precoding. The RRC configuration can include a higher layer parameter to indicate that the plurality of non-overlapping frequency domain resource allocations are based on wide-band precoding or sub-band precoding. The RRC configuration can include a higher layer parameter to configure a set of sub-bands for the uplink transmissions, and wherein the DCI indication includes a field to indicate one of the set of sub-bands. The MAC CE activation can configure a set of sub-bands for the uplink transmissions, and wherein the DCI indication includes a field to indicate one of the set of sub-bands. In some implementations, when the first bit and the second bit are indicated as "10," the DCI indication can indicate that the plurality of non-overlapping frequency domain resource allocations are based on wide-band precoding. A first SRI/TPMI field and a second SRI/TPMI field of the DCI indication can indicate a first SRS resource set configured with a lower index and a second SRS resource set configured with a higher index, respectively. In some implementations, when the first bit and the second bit are indicated as "11," the DCI indication can indicate that the plurality of non-overlapping frequency domain resource allocations are based on sub-band precoding. A first SRI/TPMI field and a second SRI/TPMI field of the DCI indication can indicate a first SRS resource set configured with a lower index and a second SRS resource set configured with a higher index, respectively. In some implementations, the downlink signaling can indicate that one or more DM-RS ports configured for the uplink transmissions are within at least two CDM groups.

In some implementations, a wireless communication node can send a downlink signaling to a wireless communication device. The downlink signaling can include a field indicating whether one or two spatial relations are associated with a plurality of uplink transmissions from the wireless communication device. A transmission scheme for the uplink transmissions can be determined based on the field.

The systems and methods presented herein include a novel approach for uplink transmission scheme in multi-TRP operation by switching the uplink transmission scheme in multi-TRP (MTRP) operation. Specifically, the systems and methods presented herein discuss a novel solution for using the indication method/techniques/procedures/steps/operations for uplink transmission scheme switching in MTRP operation to enhance/improve/increase transmission (e.g., PUSCH, physical uplink control channel (PUCCH), or sounding reference signal (SRS)) performance. In some implementations, the systems and methods provide a two-step manner, which includes radio resource control (RRC) and downlink control information (DCI). The RRC can configure at least one transmission scheme (e.g., SDM, TDM, or FDM). The DCI can indicate the type of TRP operation (e.g., single-TRP (STRP) or MTRP). In some other implementations, the systems and methods provide a three-step manner including RRC, MAC control element (MAC-CE), and DCI, which corresponds to three levels of signaling (e.g., transmission scheme, the number of MTRP, STRP/MTRP).

In further implementations, the systems and methods can provide an indication of transmission modes for SDM and/or FDM (e.g., utilize the new field for STRP/MTRP dynamic switching with 2 bits in MTRP operation). The indication of the mode can be included in a downlink control information (DCI) from the TRP (e.g., BS or node). For the SDM scheme, the transmission modes (e.g., transmission scheme) can be/include the same number of ranks/layers (e.g., generally referred to as having the same rank) or a different number of ranks (e.g., generally referred to as having different ranks) in MTRP operation. For example, the code/codepoint/bits 10 or 11 indicated/specified/identified in the new field can correspond to the modes of MTRP with the same rank or MTRP with a different rank, respectively. The combinations/values of the MTRP with different rank can be configured in the RRC.

For the FDM scheme, the transmission modes can be wideband and sub-band precoding in MTRP operation. For instance, the codepoint 10 or 11 included in the new field can correspond to the transmission modes of MTRP with wideband precoding or MTRP with sub-band precoding, respectively. Additionally, the FDRA field included in the DCI from the BS can determine/specify/indicate the granularity of FDM scheme, and the RRC or MAC CE can configure/modify the specific values/codepoints to indicate the transmission modes for the UE.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 9-10 illustrate example flow diagrams of an example method for uplink transmission scheme in MTRP operation, in accordance with an embodiment of the present disclosure.

DETAILED DESCRIPTION

1. Mobile Communication Technology and Environment

Figure 1:
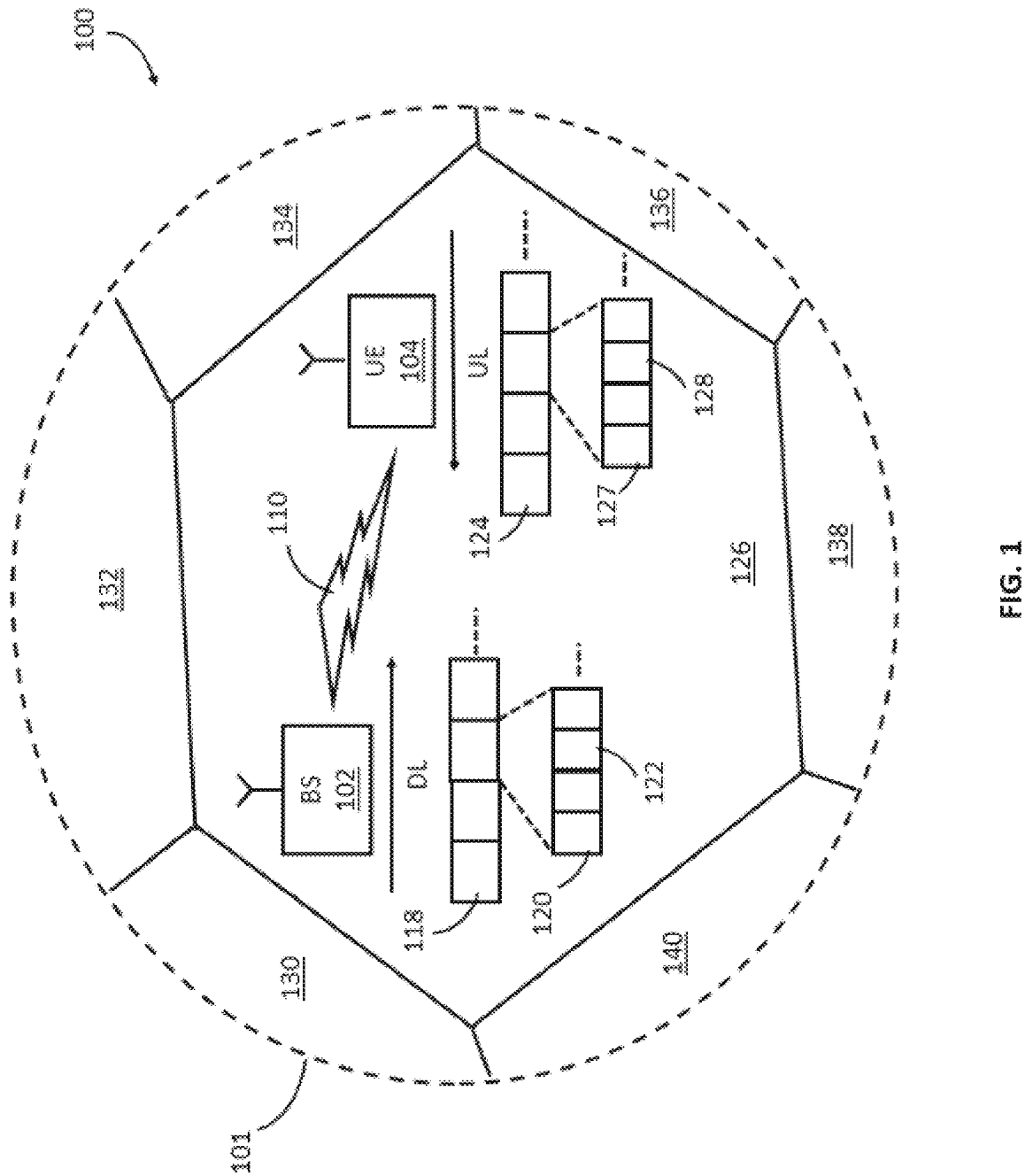
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
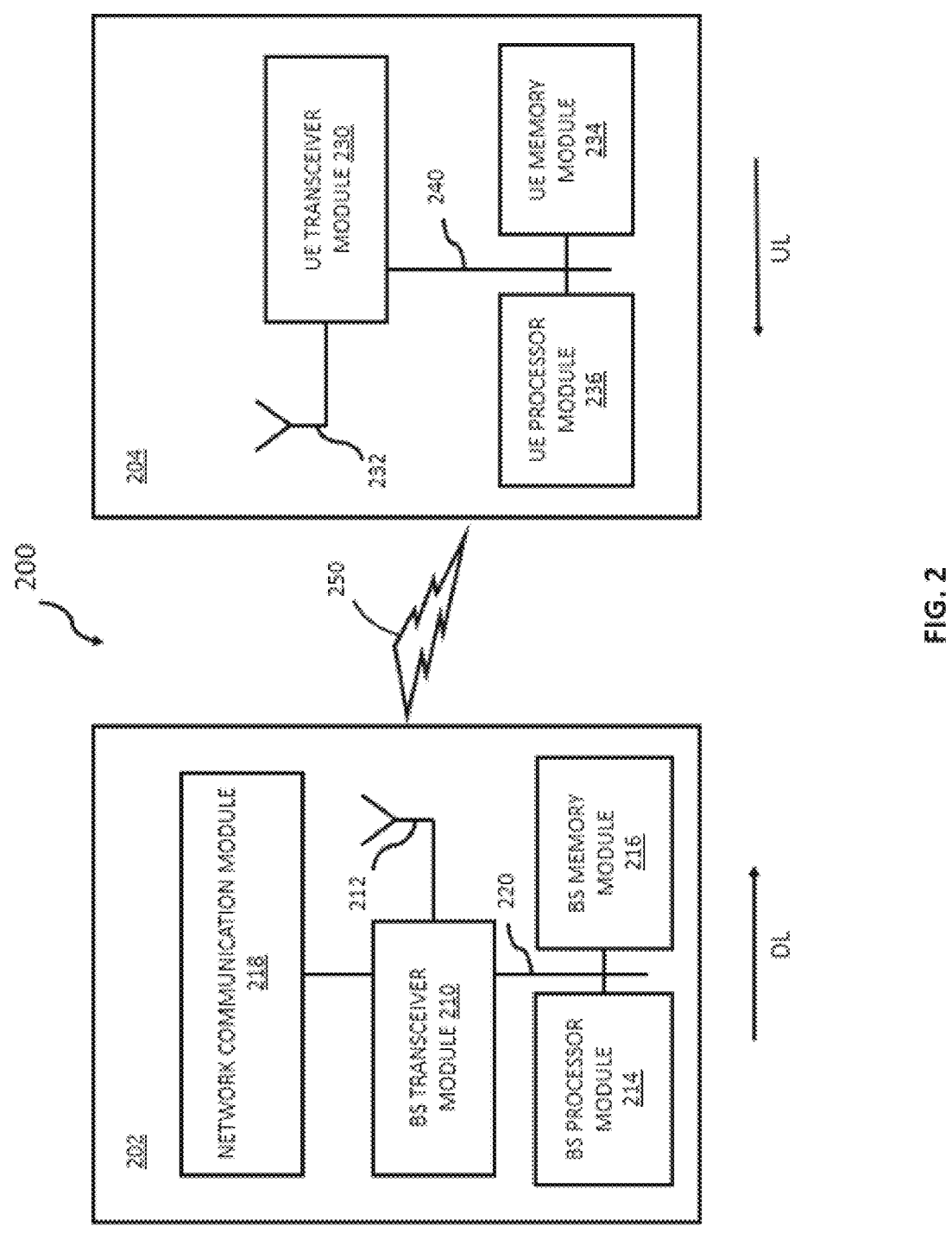
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Uplink Transmission Scheme in Multi-TRP Operation

Various protocols can include a number of multi-input-multi-output (MIMO) features that facilitate utilization of a large number of antenna elements at base station for both sub-6 GHz (Frequency Range 1, FR1) and over-6 GHz (Frequency Range 2, FR2) frequency bands. As one example, one of the MIMO features supports for multi-TRP operation. This functionality can allow system and devices to collaborate with multiple TRPs to transmit data to the UE to improve transmission performance.

Furthermore, for MTRP based uplink transmission/repetition in certain new radio (NR) systems, various types of transmission schemes were adopted for single DCI-based MTRP Physical Data Shared Channel (PDSCH) repetitions. The types of transmission schemes can include/be at least SDM, FDM-A, FDM-B, TDM-TypeA (e.g., sometimes generally referred to as TDM-A), and TDM-TypeB (e.g., sometimes generally referred to as TDM-B) schemes. Similarly, the various types of transmission schemes (e.g., SDM, FDM-A, FDM-B, TDM-TypeA, and TDM-TypeB) can be extended to uplink transmission in MTRP operation (e.g., some NR systems). Specifically, the devices (e.g., the UE or base station (BS)) can leverage/utilize/adopt one or more of these various schemes to enhance the robustness and reliability of the PUSCH transmission. The schemes discussed herein can be described in further detail in conjunction with at least FIGS. 3-7.

Additionally, for TDM scheme for MTRP PUSCH repetition in some NR systems, two SRS resource sets can be used for PUSCH repetitions toward two TRPs (or more than two TRPs), and two SRI fields and two transmit precoder matrix indicator (TPMI) fields can be used for the two SRS resource sets, respectively. A new field indicated/included in DCI including 2 bits can be introduced to indicate STRP/MTRP dynamic switching, as discussed in further detail in conjunction with at least FIG. 8. For instance, the codepoints "00" and "01" may be used to indicate the selected TRP in STRP operation. The codepoints "10" and "11" may be used to indicate a TRP order in MTRP operation. Hence, the UE can receive the DCI from the BS to determine which of the transmission schemes to utilize or to perform STRP/MTRP dynamic switch.

Referring generally to FIGS. 3-7, depicted are example schemes for MTRP uplink transmission. Each of the example schemes can include TRP0 310, TRP1 320, and UE 330 (e.g., wireless communication device, client device, mobile device, laptop, etc.). The TRP0 310 and/or TRP1 320 can include features or functionalities of a BS, such as features of BS 102. In some cases, the TRP0 310 and/or TRP1 320 can be or correspond to the BS. The TRP0 310 and/or TRP1 320 may be referred to as a wireless communication node. The UE 330 can include features or functionalities of or correspond to the UE 104. The UE 330 can include or be equipped/installed/constructed with multi-panels for uplink transmission (e.g., PUSCH, PUCCH, and SRS). Through the multiple UE panels, the UE 330 can exchange/communicate/transfer data/information/packets/instructions with TRP0 310 and/or TRP1 320. The UE 330 equipped with multiple panels can include one or more uplink transmissions occupying one or more layers (e.g., UE panel(s)). The UE 330 can send/transmit/communicate uplink transmission to at least one of the TRP0 310 and/or TRP1 320 using one or more of the layers equipped to the UE 330. The UE 330 can interact/communicate with the TRP0 310 and/or TRP1 320 using various schemes. The features or functionalities discussed herein can be performed/utilized/executed by one or more components/devices (e.g., BS 102, UE 104, etc.) in conjunction with at least FIGS. 1-2. The various schemes and determination of which scheme to utilize can be discussed in further detail herein.

Figure 3:
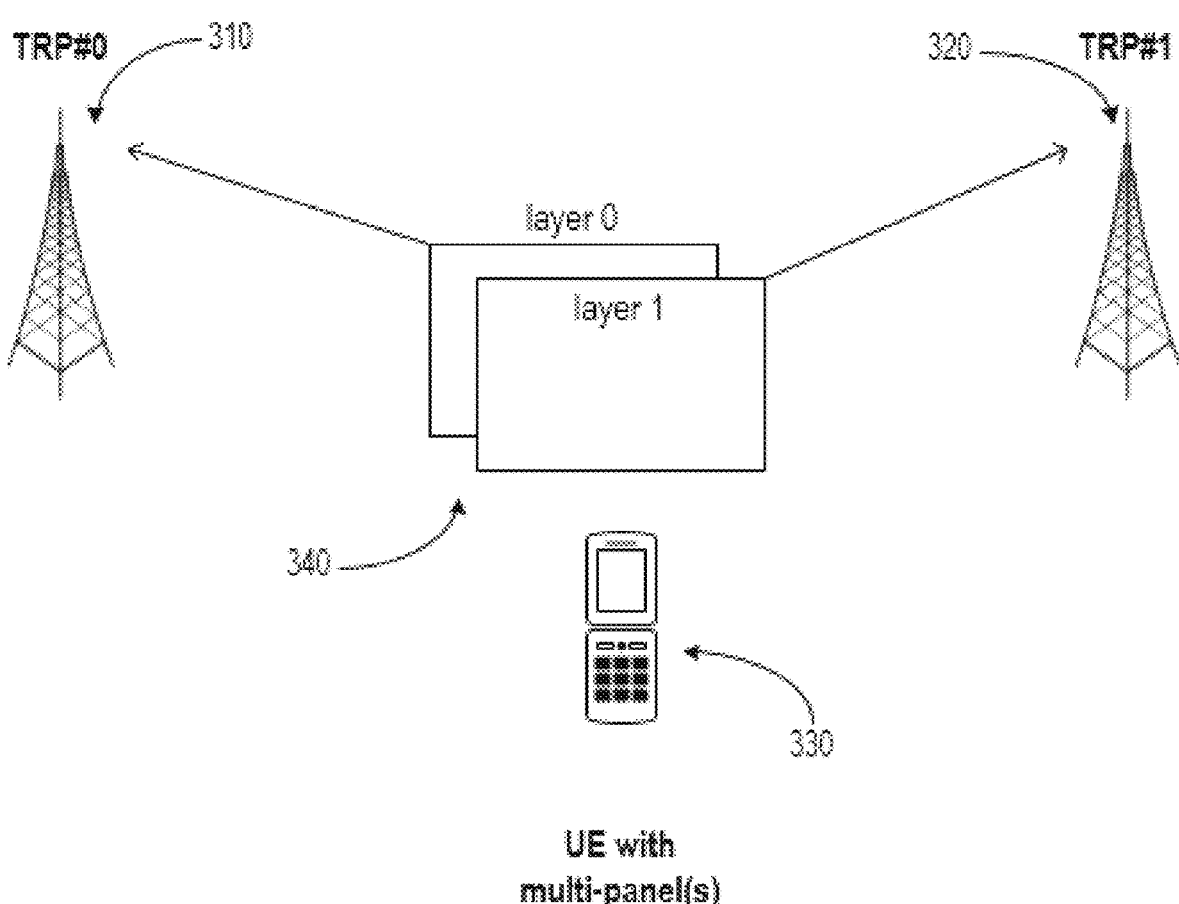
FIGS. 3-7 illustrate example schemes for MTRP uplink transmission, in accordance with some embodiments of the present disclosure.

Referring to FIG. 3 in further detail, depicted is an example SDM scheme 300 for MTRP uplink transmission. In the SDM scheme 300, the UE 330 may leverage/utilize/include two uplink transmissions occupying different layers 340 (e.g., layer0 and layer1). The UE 330 can allocate the uplink transmissions to the same time-frequency domain resources. The UE 330 can transmit the two uplink transmissions to different TRPs (e.g., TRP0 310 and TRP1 320).

Figure 4:
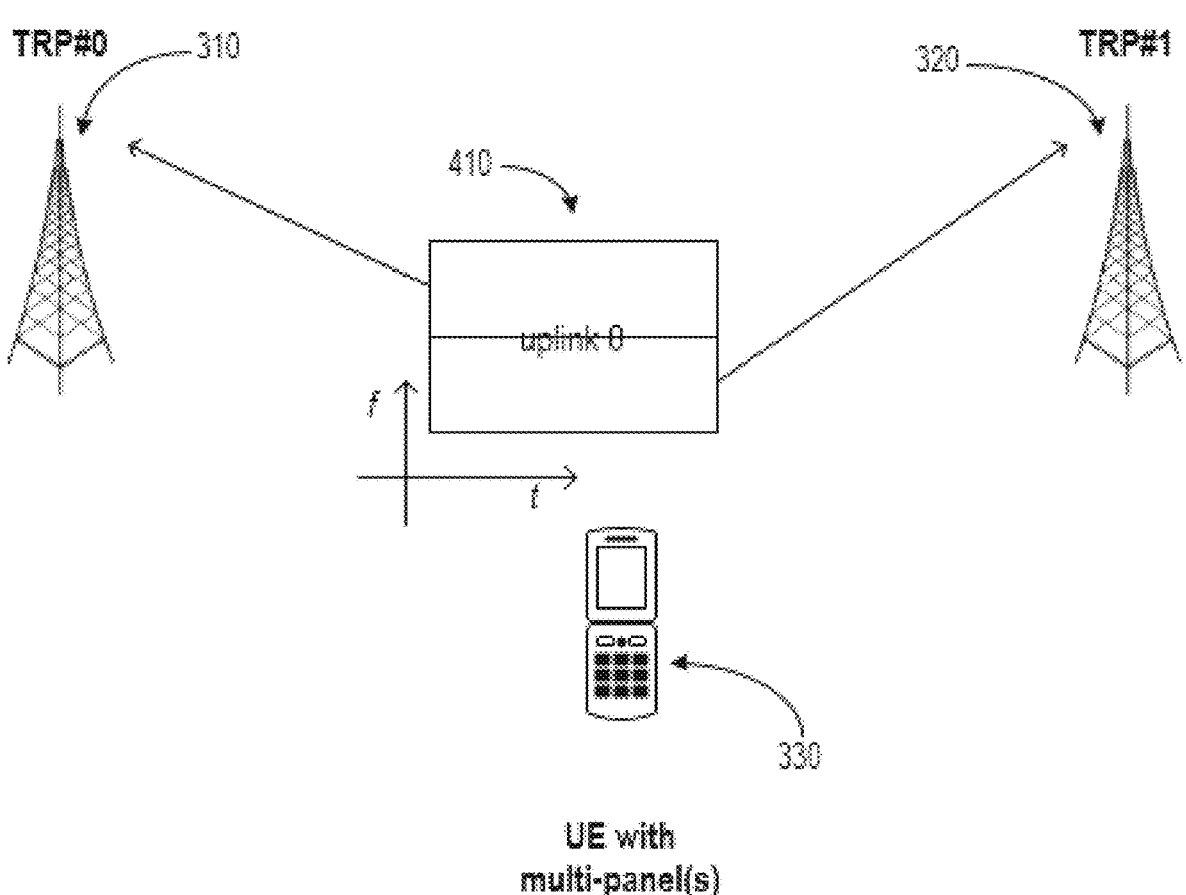

Referring to FIG. 4, depicted is an example FDM-A scheme 400 for MTRP uplink transmission. In the FDM-A scheme 400, the UE 330 may split a single uplink transmission 410 into two parts. In this case, the uplink0 (e.g., uplink transmission 410) can be split into two different parts in the same layer. The UE 330 can allocate a first part and the second part of the uplink transmission 410 to different frequency domain resources, while the two parts are allocated to the same time domain resources, for example. Accordingly, the UE 330 can transmit the two parts of the uplink transmission 410 to different TRPs.

Figure 5:
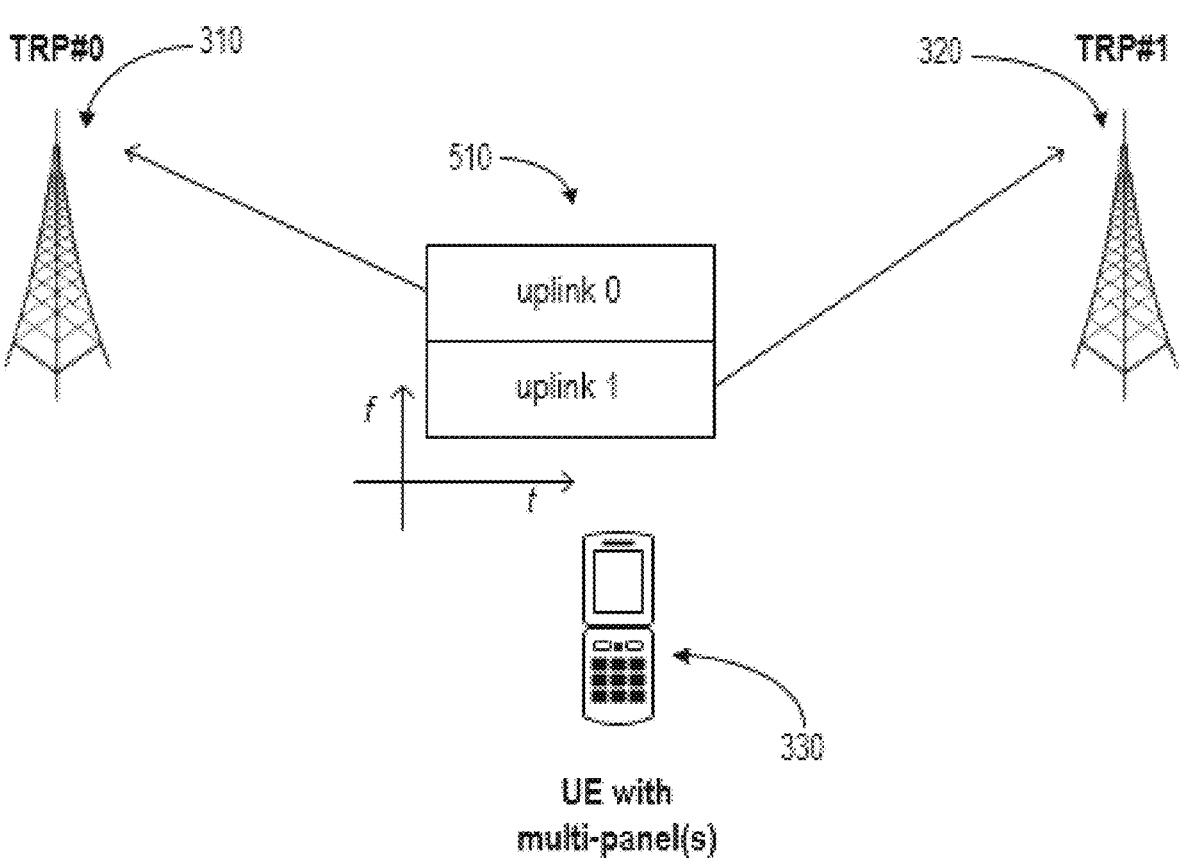

Referring to FIG. 5, depicted is an example FDM-B scheme 500 for MTRP uplink transmission. In the FDM-B scheme 500, the UE 330 can assign/allocate/occupy two uplink transmissions 510 (e.g., uplink 0 and uplink 1) to different frequency domains. The uplink transmissions 510 may occupy the same time domain and transmission layer. Accordingly, the UE 330 can transmit the two uplink transmissions 510 to different TRPs in the FDM-B scheme 500.

Figure 6:
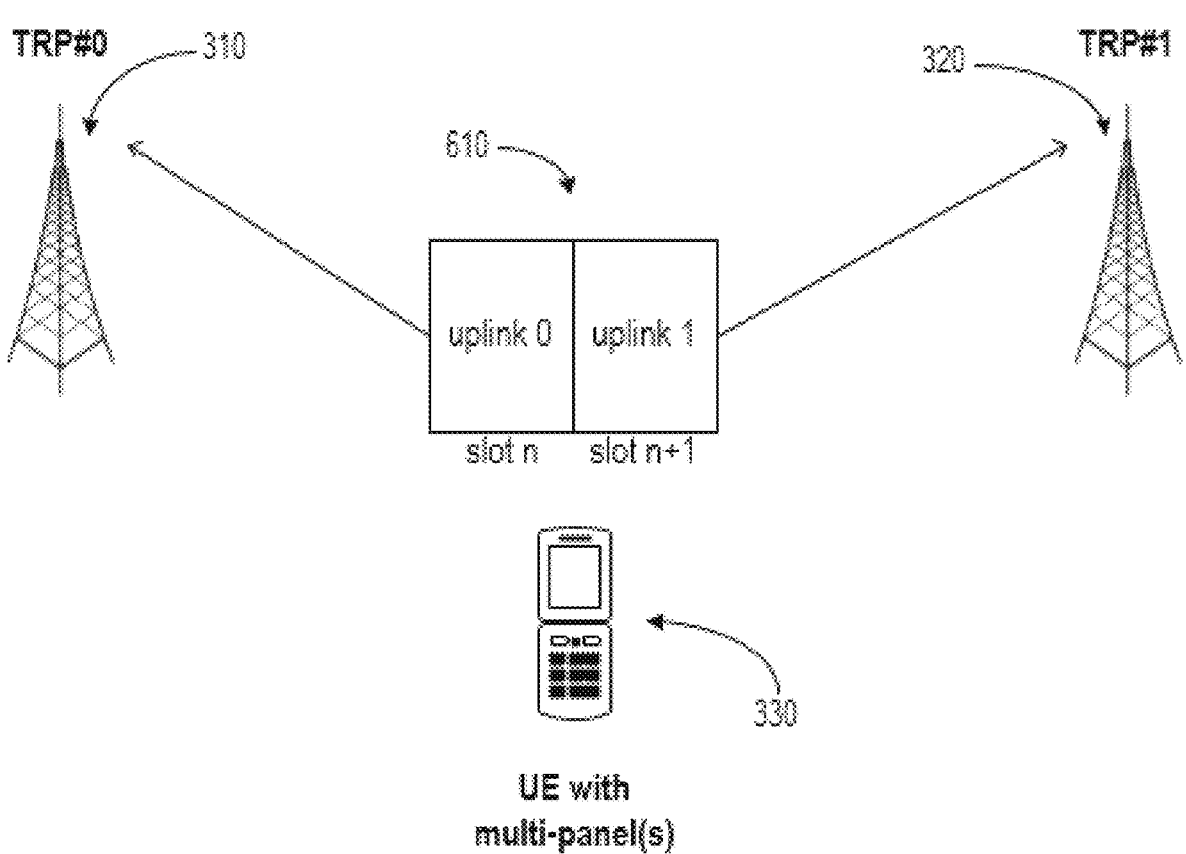

Referring to FIG. 6, depicted is an example TDM-TypeA scheme 600 for MTRP uplink transmission. In TDM-TypeA scheme 600, the UE 330 can allocate two uplink transmissions 610 to different time-domain resources in different slots (e.g., intra-slots), with the uplink transmissions 610 allocated to the same frequency domain resources and transmission layer. The slots may include slot n for uplink0 and slot n+1 for uplink1 (e.g., slot 0 for uplink0 and slot 1 for uplink1). Subsequently, the UE 330 can send/transmit/communicate the uplink transmissions 610 to different TRPs in TDM-TypeA scheme 600.

Figure 7:
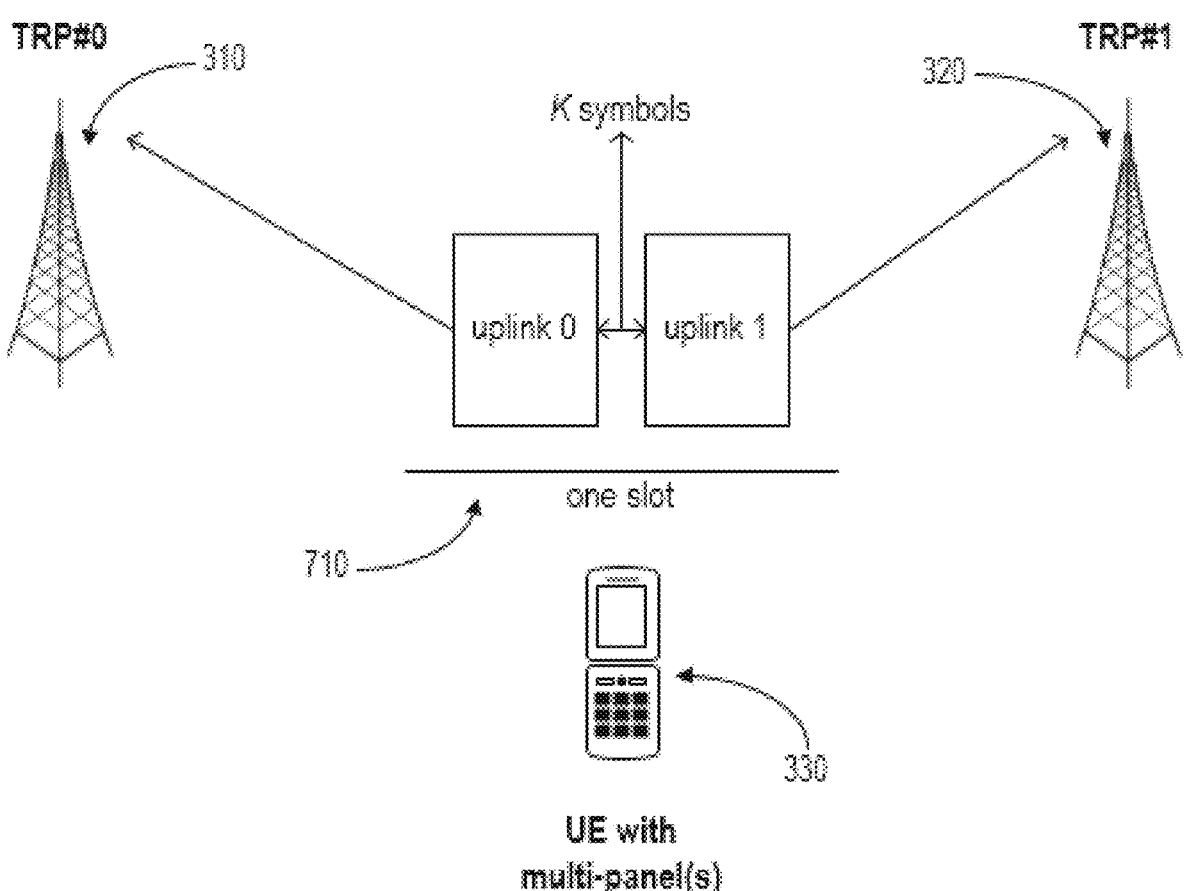

Referring to FIG. 7, depicted is an example TDM-TypeB scheme 700 for MTRP uplink transmission. In TDM-TypeB scheme 700, the UE 330 can allocate two uplink transmissions 710 to different time-domain resources in a single slot. The UE 330 can allocate the two uplink transmissions 710 to the same frequency domain resources and transmission layer. Subsequently, the UE 330 can transmit the uplink transmissions 710 to different TRPs in TDM-TypeB scheme 700. The UE 330 can determine to use at least one of the aforementioned transmission schemes (e.g., schemes of at least FIGS. 3-7) based on the Do received from at least one TRPs or BS, where the DCI may be configured by the RRC. The UE 330 can determine the scheme to use as discussed herein in conjunction with at least FIG. 8. Further, as an example, Table 1 lists the SRS resource set(s) and SRI/TPMI associated with the respective codepoint (e.g. 2 bits of the field in DCI) which can be used to indicate STRP/MTRP dynamic switching when using TDM scheme in MTRP operation. In some cases, the SRS resource set with a lower identifier (ID)/indices/codepoint (e.g., codepoint "00") may be the first SRS resource set, and the other SRS resource sets may be the second SRS resource set.

TABLE 1

| Codepoint | SRS resource set(s) | SRI (for both CB and NCB)/TPMI (CB only) field(s) |
|---|---|---|
| 00 | S-TRP mode with 1$^{st}$ SRS resource set (TRP1) | 1$^{st}$ SRI/TPMI field (2$^{nd}$ field is unused) |
| 01 | S-TRP mode with 2$^{nd}$ SRS resource set (TRP2) | 1$^{st}$ SRI/TPMI field (2$^{nd}$ field is unused) |
| 10 | m-TRP mode with (TRP1, TRP2 order) 1$^{st}$ SRI/TPMI field: 1$^{st}$ SRS resource set 2$^{nd}$ SRI/TPMI field: 2$^{nd}$ SRS resource set | Both 1$^{st}$ and 2$^{nd}$ SRI/TPMI fields |
| 11 | m-TRP mode with (TRP2, TRP1 order) 1$^{st}$ SRI/TPMI field: 1$^{st}$ SRS resource set 2$^{nd}$ SRI/TPMI field: 2$^{nd}$ SRS resource set | Both 1$^{st}$ and 2$^{nd}$ SRI/TPMI fields |

Figure 8:
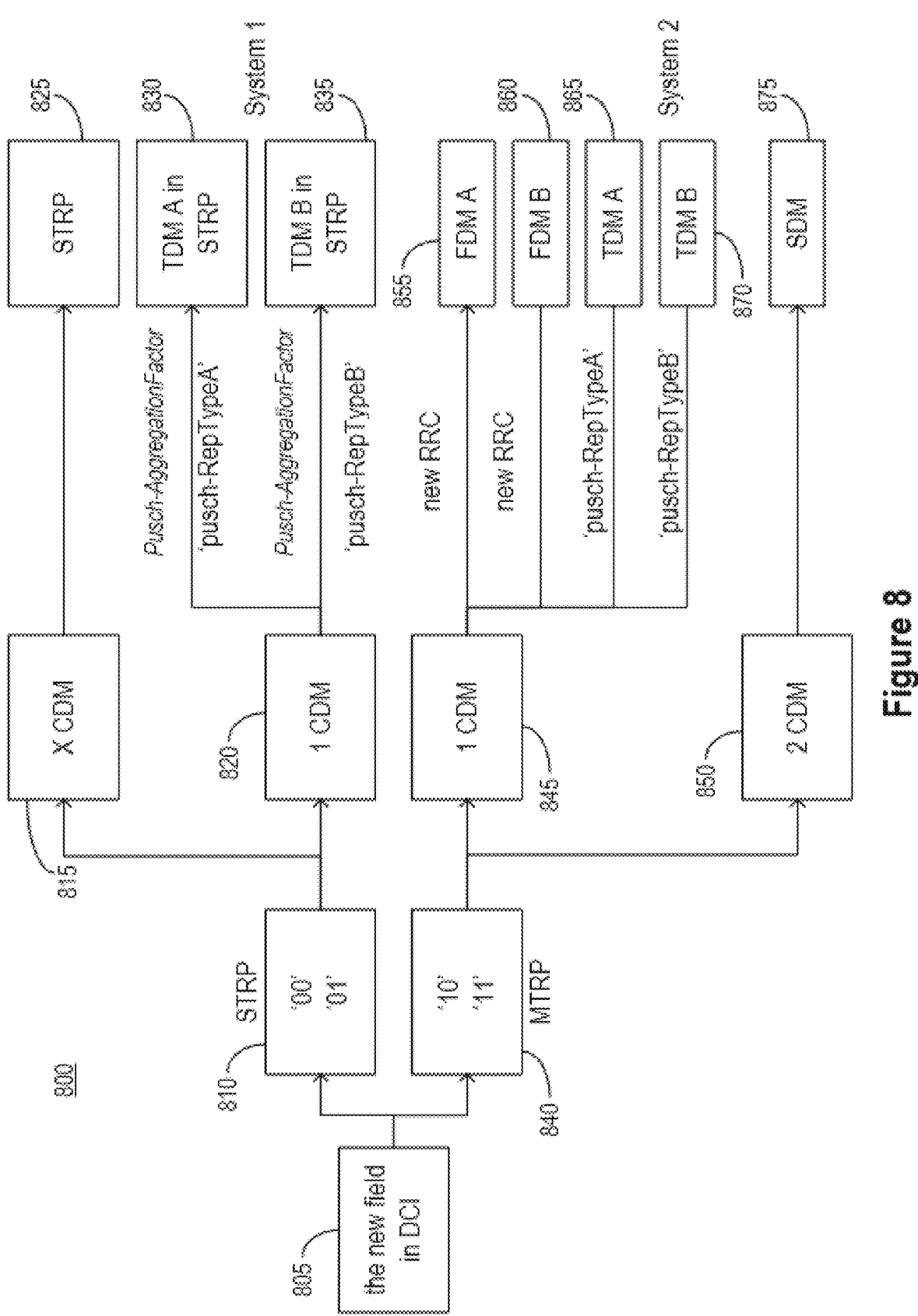
FIG. 8 illustrates an example flowchart of the transmission schemes, in accordance with some embodiments of the present disclosure.

Referring to FIG. 8, depicted is an example flowchart 800 of the transmission schemes. The transmission schemes discussed herein can be executed/performed/utilized for communication between one or more components (e.g., BS 102, UE 104, TRP0 310, TRP1 320, UE 330, etc.) of at least FIGS. 1-7. For instance, a UE can receive a DCI from the BS including a field (e.g., new field 805) including codepoints/ bits, such as 00, 01, 10, or 11. The bits can represent whether to use STRP 810 or MTRP 840 (e.g., 00 and 01 can represent STRP, and 10 and 11 can represent MTRP). The DCI can indicate/include/provide a demodulation reference signal (DMRS) port(s) to the UE. The DMRS port can indicate the one or more code division multiplexing (CDM) groups (e.g., CDM 815, CDM 820, CDM 845, or CDM 850) to use for uplink transmission (e.g., PUSCH, PUCCH, or SRS). Further, with the DCI, the UE can determine which of the schemes (e.g., STRP 825, TDM A in STRP 830, TDM B in STRP 835, FDM A 855, FDM B 860, TDM A in MTRP 865, TDM B in MTRP 870, or SDM 875) to utilize for transmitting uplink transmission to the TRP(s). For example, the STRP 825, TDM A in STRP 830, and/or TDM B in STRP 835 may be included/part of/associated with a first system (e.g., system 1 or one of the NR systems). In another example, the FDM A 855, FDM B 860, TDM A 865, TDM B 870, and/or SDM 875 may be associated with a second system (e.g., system 2, or another one of the NR systems). Examples of selection/determination of the transmission schemes can be described in further detail in at least the following example implementations, which can be performed in conjunction with at least FIGS. 1-7.

A. Implementation 1: General Description for Determining Transmission Scheme of STRP The UE can determine the transmission scheme of the uplink transmissions according to the received signaling (e.g., downlink signaling or DCI). In some implementations, the signaling received from the BS can include/be a part of/correspond to an RRC configuration or a DCI indication. The uplink transmission can include/be PUSCH, PUCCH, or SRS. In some cases, the PUSCH can be a codebook or a non-codebook-based transmission. In some implementations, the UE can transmit the transmission (e.g., uplink transmission) in repetition (e.g., consecutively) or on occasion (e.g., based on a timer or responsive to an indication to transmit the transmission).

In some implementations, the transmission scheme can include the UE transmitting a single uplink transmission occasion of the transport block (TB) with one spatial relation (e.g., corresponding to or associated with a TRP). The occasion can correspond to the spatial relation. In some implementations, the field included in the DCI can include 2 bits which can be set to "00" or "01". The 2 bits included in the field can indicate the uplink transmissions associated with one or two SRS resource sets with respective spatial relations. In some implementations, the UE can identify/ determine DMRS port(s) for the uplink transmissions within one or more CDM groups based on the DCI field (e.g., Antenna Port(s) field). For instance, the DMRS port(s) can indicate for the UE to transmit the uplink transmissions within the CDM 815 based on the DCI field. Accordingly, the UE can utilize the STRP scheme to send an uplink transmission to the TRP.

B. Implementation 2: General Description for Determining Transmission Scheme of SDM The UE can determine the transmission scheme of the uplink transmissions according to the received signaling (e.g., downlink signaling or DCI). In some implementations, the signaling (e.g., DCI or downlink signaling) received from the BS can include/be a part of/correspond to an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting a single uplink transmission occasion of the TB with each spatial relation associated with a group of transmission layers. The UE can transmit the uplink transmission under SDM scheme, such as described in conjunction with FIG. 3. The occasion can correspond to a spatial relation. In some implementations, based on the DCI, the UE can be scheduled to simultaneously transmit the uplink transmission occasions of the TB with different spatial relations associated with different groups of transmission layers. In some implementations, the number of both different spatial relations and different groups of transmission layers can be two (e.g., the number of spatial relations can be 2 and/or the number of different groups of transmission layers can be 2).

In some implementations, the DCI can determine the association between the spatial relation and the group of transmission layers. In some cases, the RRC signaling can configure the association between the spatial relation and the group of transmission layers. In some implementations, if the uplink transmission is PUSCH, the DCI can indicate the association in the SRI field(s) of the DCI. In some other implementations, if the uplink transmission is PUSCH, the association can be determined by the SRS resource set(s) configured by the RRC for the PUSCH transmissions. In some implementations, the field with 2 bits in DCI can be set to "10" or "11" to indicate that the uplink transmissions are associated with one or two SRS resource sets with the respective spatial relations. In some implementations, the UE can identify/determine/be indicated with DMRS port(s) for the uplink transmissions within at least two CDM groups based on the DCI field (e.g., Antenna Port(s) field). The UE can use the SDM scheme as described in conjunction with FIG. 3.

C. Implementation 3: General Description for Determining Transmission Scheme of FDM-A In some implementations, The UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting a single uplink transmission occasion of the TB with each spatial relation associated with a non-overlapping frequency domain resource allocations. The occasion can correspond to a spatial relation. The UE can be scheduled to simultaneously transmit the uplink transmission occasions of the TB allocated in different non-overlapping frequency domain resources. The scheduling of the UE can be indicated in the DCI. The number of both the different spatial relations and different non-overlapping frequency domain resource allocations can be two.

In some implementations, the DCI can indicate the association between one spatial relation and one non-overlapping frequency domain resource allocation, which can also be configured by RRC signaling. For instance, if the uplink transmission is PUSCH, the association can be indicated by the SRI field(s) in DCI. In another example, if the uplink transmission is PUSCH, the association can be determined by the SRS resource set(s) which may be configured by RRC for the PUSCH transmissions.

In some implementations, the RRC configuration can include/correspond to/be a higher layer parameter which can be set to a specific value corresponding to a uplink transmission scheme. As an example, the higher layer parameter pusch-Rep TypeIndicatorDCI-0-1-r16 can be set to 'FDMSchemeA'. In another example, the higher layer parameter pusch-Rep TypeIndicatorDCI-0-2-r16 can be set to 'FDMSchemeA'. In some implementations, the field with 2 bits in DCI can be set to "10" or "11" to indicate that the uplink transmissions are associated with one or two SRS resource sets with the respective spatial relations. In some implementations, the UE can identify/determine/be indicated with DMRS port(s) for the uplink transmissions within at least two CDM groups based on the Antenna Port(s) in the DCI field. The UE can use the FDM-A scheme as described in conjunction with FIG. 4.

D. Implementation 4: General Description for Determining Transmission Scheme of FDM-B In some implementations, The UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting different uplink transmission occasions of the same TB with each spatial relation corresponding to an uplink transmission occasion (e.g., different uplink transmission occasions transmitted to different TRPs). In this case, each uplink transmission occasion may include non-overlapping frequency domain resource allocation with respect to the other uplink transmission occasion. The occasion can correspond to a spatial relation. The UE can be scheduled to simultaneously transmit the uplink transmission occasions of the same TB allocated in different non-overlapping frequency domain resources. The number of both the different spatial relations and different non-overlapping frequency domain resource allocations can be two In some implementations, the DCI can indicate the association between one spatial relation and one non-overlapping frequency domain resource allocation, which can be configured by RRC signaling. For instance, if the uplink transmission is PUSCH, the association can be indicated by the SRI field(s) in DCI. In another example, if the uplink transmission is PUSCH, the association can be determined by the SRS resource set(s) which may be configured by RRC for the PUSCH transmissions. In some cases, if the uplink transmission is PUSCH, the association can be indicated by the SRI field(s) in DCI.

In some implementations, the RRC configuration can include/correspond to/be a higher layer parameter which can be set to a specific value corresponding to a uplink transmission scheme. For example, the higher layer parameter pusch-Rep TypeIndicatorDCI-0-1-r16 can be set to 'FDMSchemeB'. In another example, the higher layer parameter pusch-Rep TypeIndicatorDCI-0-2-r16 can be set to 'FDMSchemeB'. In some implementations, the field with 2 bits in DCI can be set to "10" or "11" to indicate that the uplink transmissions are associated with one or two SRS resource sets with respective spatial relations. In some implementations, the UE can identify/determine/be indicated with DMRS port(s) for the uplink transmissions within one CDM group by the DCI field "Antenna Port(s)". The UE can use the FDM-B scheme as described in conjunction with FIG. 5.

E. Implementation 5: General Description for Determining Transmission Scheme of TDM-TypeA in STRP Operation In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting multiple slot level uplink transmission occasions of the same TB with one spatial relation used across the multiple uplink transmission occasions. The occasion can correspond to a spatial relation. The association between the spatial relation and the slot level uplink transmission occasion can be determined by DCI indication and/or configured by RRC signaling.

In some cases, if the uplink transmission is PUSCH, the association can be indicated by the SRI field(s) in DCI. In some cases, if the uplink transmission is PUSCH, the association can be determined by the SRS resource set(s) which may be configured by RRC for the PUSCH transmissions.

In some implementations, the RRC configuration can include/correspond to/be a higher layer parameter which can be set to a specific value corresponding to a uplink transmission scheme. For example, the higher layer parameter pusch-Rep TypeIndicatorDCI-0-1-r16 can be set to 'pusch-RepTypeA'. In another example, the higher layer parameter pusch-RepTypeIndicatorDCI-0-2-r16 can be set to 'pusch-RepTypeA'. In further example, the higher layer parameter pusch-AggregationFactor can be set to one of {n2, n4, n8}. In some implementations, the field with 2 bits in DCI can be set to "00" or "01" to indicate that the uplink transmissions are associated with one or two SRS resource sets with respective spatial relations. In some implementations, the UE can identify/determine/be indicated with DMRS port(s)

for the uplink transmissions within one CDM group based on the Antenna Port(s) in the DCI field.

F. Implementation 6: General Description for Determining Transmission Scheme of TDM-TypeA in MTRP Operation In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting multiple slot level uplink transmission occasions of the same TB with multiple spatial relations used across the multiple uplink transmission occasions. The occasion can correspond to a spatial relation. The number of multiple spatial relations can be two. The association between the spatial relation and the slot level uplink transmission occasion can be determined by DCI indication and/or configured by RRC signaling.

In some cases, if the uplink transmission is PUSCH, the association can be indicated by the SRI field(s) in DCI. In some cases, if the uplink transmission is PUSCH, the association can be determined by the SRS resource set(s) which may be configured by RRC for the PUSCH transmissions.

In some implementations, the RRC configuration can include/correspond to/be a higher layer parameter which can be set to a specific value corresponding to a uplink transmission scheme. For example, the higher layer parameter pusch-Rep TypeIndicatorDCI-0-1-r16 can be set to 'pusch-RepTypeA'. In another example, the higher layer parameter pusch-RepTypeIndicatorDCI-0-2-r16 can be set to 'pusch-RepTypeA'. In further example, the higher layer parameter pusch-AggregationFactor can be set to one of {n2, n4, n8}. In some implementations, the field with 2 bits in DCI can be set to "10" or "11" to indicate that the uplink transmissions are associated with at least one or two SRS resource sets with respective spatial relations. In some implementations, the UE can identify/determine/be indicated with DMRS port(s) for the uplink transmissions within at least two CDM groups based on the field "Antenna Port(s)" in the DCI. The UE can use the TDM-TypeA scheme in MTRP Operation as described in conjunction with FIG. 6.

G. Implementation 7: General Description for Determining Transmission Scheme of TDM-TypeB in STRP Operation In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting different uplink transmission occasions of the same TB with one spatial relation corresponding to an uplink transmission occasion. In this case, each uplink transmission may include non-overlapping time domain resource allocation with respect to the other uplink transmission occasion. Further, in this case, all of the PDSCH transmission occasions can be received within a given slot. The occasion can correspond to a spatial relation. The number of different uplink transmission occasions can be two. In some implementations, the association between the spatial relation and the non-overlapping time domain resource allocation can be determined by DCI indication and/or configured by RRC signaling.

In some cases, if the uplink transmission is PUSCH, the association can be indicated by the SRI field(s) in DCI. In some cases, if the uplink transmission is PUSCH, the association can be determined by the SRS resource set(s) which configured by RRC for the PUSCH transmissions.

In some implementations, the RRC configuration can include/correspond to/be a higher layer parameter which can be set to a specific value corresponding to a uplink transmission scheme. For example, the higher layer parameter pusch-Rep TypeIndicatorDCI-0-1-r16 can be set to 'pusch-RepTypeB'. In another example, the higher layer parameter pusch-RepTypeIndicatorDCI-0-2-r16 can be set to 'pusch-RepTypeB'. In further example, the higher layer parameter pusch-AggregationFactor can be set to one of {n2, n4, n8}. In some implementations, the field with 2 bits in DCI can be set to "00" or "01" to indicate that the uplink transmissions are associated with one or two SRS resource sets with respective spatial relations. In some implementations, the UE can identify/determine/be indicated with DMRS port(s) for the uplink transmissions within one CDM group based on the field "Antenna Port(s)" in the DCI.

H. Implementation 8: General Description for Determining Transmission Scheme of TDM-TypeB in MTRP Operation In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting different uplink transmission occasions of the same TB with each spatial relation corresponding to an uplink transmission occasion. In this case, each uplink transmission may include non-overlapping time domain resource allocation with respect to the other uplink transmission occasion. Further, in this case, all of the PDSCH transmission occasions can be received within a given slot. The occasion can correspond to a spatial relation. The number of both different spatial relations and different uplink transmission occasions can be two. In some implementations, the association between the spatial relation and the non-overlapping time domain resource allocation can be determined by DCI indication and/or configured by RRC signaling.

In some cases, if the uplink transmission is PUSCH, the association can be indicated by the SRI field(s) in DCI. In some cases, if the uplink transmission is PUSCH, the association can be determined by the SRS resource set(s) which configured by RRC for the PUSCH transmissions.

In some implementations, the RRC configuration can include/correspond to/be a higher layer parameter which can be set to a specific value corresponding to a uplink transmission scheme. For example, the higher layer parameter pusch-Rep TypeIndicatorDCI-0-1-r16 can be set to 'pusch-RepTypeB'. In another example, the higher layer parameter pusch-RepTypeIndicatorDCI-0-2-r16 can be set to 'pusch-RepTypeB'. In further example, the higher layer parameter pusch-AggregationFactor can be set to one of {n2, n4, n8}. In some implementations, the field with 2 bits in DCI can be set to "10" or "11" to indicate that the uplink transmissions are associated with one or two SRS resource sets with respective spatial relations. In some implementations, the UE can identify/determine/be indicated with DMRS port(s) for the uplink transmissions within at least two CDM groups based on the field "Antenna Port(s)" in the DCI. The UE can use the TDM-TypeB scheme in MTRP Operation as described in conjunction with FIG. 7. Other implementations, embodiments, and/or examples can be further described herein. For instance, example implementations 9-12 may correspond to/be a part of/be an additional implementation of example implementations 1-8, such as in conjunction with/addition to FIG. 8. The implementations, discussed above and herein can be performed/executed/utilized/adopted by one or more components in conjunction with FIGS. 1-7.

I. Implementation 9: General Description of Two-Step Manner for Determining Transmission Scheme In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the received signaling (e.g., downlink signaling) can include at least the RRC configuration and DCI indication (e.g., field included in the DCI). In some implementations, the RRC configuration can include/correspond to/be a higher layer parameter which can be set to a specific value corresponding to a uplink transmission scheme. For example, the higher layer parameter pusch-RepTypeIndicatorDCI-0-1-r16 can be set to one of 'SDMScheme', 'FDMSchemeA', 'FDMSchemeB', 'pusch-RepTypeA', 'pusch-RepTypeB'. In another example, the higher layer parameter pusch-RepTypeIndicatorDCI-0-2-r16 can be set to one of 'SDMScheme', 'FDMSchemeA', 'FDMSchemeB', 'pusch-RepTypeA', 'pusch-RepTypeB'.

In some implementations, the DCI indication can be/refer to the field with 2 bits in DCI used to indicate the uplink transmissions associated with one or two SRS resource sets with respective spatial relations (e.g., STRP/MTRP operation). In some cases, the value of the field with 2 bits can be "00" or "01", where the uplink transmissions may be associated with one SRS resource set. In some other cases, the value of the field with 2 bits can be "10" or "11", where the uplink transmissions may be associated with two SRS resource sets.

J. Implementation 10: General Description of Three-Step Manner for Determining Transmission Scheme In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the received signaling can be/include/correspond to RRC configuration and/or MAC CE activation and/or DCI indication. In some implementations, the RRC configuration can include/correspond to/be a higher layer parameter which can be set to a specific value corresponding to a uplink transmission scheme. For example, the higher layer parameter pusch-RepTypeIndicatorDCI-0-1-r16 can be set to one of 'SDMScheme', 'FDMSchemeA', 'FDMSchemeB', 'pusch-RepTypeA', 'pusch-RepTypeB'. In another example, the higher layer parameter pusch-RepTypeIndicatorDCI-0-2-r16 can be set to one of 'SDMScheme', 'FDMSchemeA', 'FDMSchemeB', 'pusch-RepTypeA', 'pusch-RepTypeB'.

In some implementations, the MAC CE activation can be used to indicate multiple SRS resource sets or multiple spatial relations for the uplink transmissions. In some implementations, the number of activated SRS resource sets or spatial relations can be more than two. In some implementations, the DCI indication can be/refer to the field with 2 bits in DCI used to indicate the uplink transmissions associated with one or two SRS resource sets with respective spatial relations. In some cases, the value of the field with 2 bits can be "00" or "01", where the uplink transmissions are associated with one SRS resource set. In some other cases, the value of the field with 2 bits can be "10" or "11", where the uplink transmissions are associated with two SRS resource sets.

K. Implementation 11: General Description of the Same or Different Layer Based SDM Scheme in MTRP Operation In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the received signaling can be RRC configuration and/or DCI indication. In some implementations, the transmission scheme can indicate/include the UE transmitting a single uplink transmission occasion of the TB with each spatial relation associated with a group of transmission layers (e.g., SDM scheme). In some implementations, an occasion can correspond to a spatial relation. In some implementations, the UE can be scheduled to simultaneously transmit the uplink transmission occasions of the TB with different spatial relations associated with different groups of transmission layers.

In some implementations, the number of both different spatial relations and different groups of transmission layers can be two. In some cases, the number of SRS resource sets for the uplink transmissions can be two. In some implementations, the number of the two groups of transmission layers can be the same or different, which can be determined by DCI indication and/or RRC configuration. In some implementations, the RRC configuration can be the higher layer parameter(s) which can indicate the respective number of the two groups of transmission layers or the combination of the number of the two groups of transmission layers. In some implementations, the DCI indication can include the field with 2 bits in DCI which can be used to indicate the uplink transmissions associated with one or two SRS resource sets with respective spatial relations.

In some cases, one value of the field (e.g., "10") can be used to indicate that the number of the two groups of transmission layers is the same. In these cases, the first and second SRI/TPMI fields in DCI may be used to the SRS resource sets configured with lower and higher indices/IDs (e.g., RRC-configured ID of the SRS resource set), respectively. In some other cases, one value of the field (e.g., "11") can be used to indicate that the number of the two groups of transmission layers is different. In these cases, the first and second SRI/TPMI fields in DCI may be used to the SRS resource sets associated with higher and lower transmission layers, respectively.

In some cases, the field with 2 bits in DCI used to indicate the uplink transmissions associated with one or two SRS resource sets with respective spatial relations can be set as "10" or "11" (e.g., field set to 10 or 11 to indicate that the uplink transmissions are associated with one or two SRS resource sets with respective spatial relations). In some implementations, the DCI field "Antenna Port(s)" can indicate the UE with DM-RS port(s) for the uplink transmissions within at least two CDM groups.

In some implementations, Table 2 lists the SRS resource set(s) and SRI/TPMI associated with the respective codepoint (e.g. 2 bits of the field in DCI) which can be used to indicate STRP/MTRP dynamic switching when using SDM scheme in MTRP operation. For example, the SRS resource set with lower ID can be the first SRS resource set, and the SRS resource sets can be the second SRS resource set.

TABLE 2

| Codepoint | SRS resource set(s) | SRI (for both CB and NCB)/TPMI (CB only) field(s) |
|---|---|---|
| 00 | s-TRP mode with $1^{st}$ SRS resource set (TRP1) | $1^{st}$ SRI/TPMI field ($2^{nd}$ field is unused) |
| 01 | s-TRP mode with $2^{nd}$ SRS resource set (TRP2) | $1^{st}$ SRI/TPMI field ($2^{nd}$ field is unused) |
| 10 | m-TRP mode with same rank {1 + 1 or 2 + 2} $1^{st}$ SRI/TPMI field: $1^{st}$ SRS resource set $2^{nd}$ SRI/TPMI field: $2^{nd}$ SRS resource set | Both $1^{st}$ and $2^{nd}$ SRI/TPMI fields |
| 11 | m-TRP mode with different rank {1 + 2 or 2 + 1} $1^{st}$ SRI/TPMI field: SRS resource set with higher rank/layers $2^{nd}$ SRI/TPMI field: SRS resource set with lower rank/layers | Both $1^{st}$ and $2^{nd}$ SRI/TPMI fields |

L. Implementation 12: General Description of Wide-Band or Sub-Band Precoding Based FDM Scheme in MTRP Operation In some implementations, the UE can determine the transmission scheme of the uplink transmissions according to the received signaling (e.g., downlink signaling or DCI). In some implementations, the received signaling can include an RRC configuration or a DCI indication. The uplink transmission can include/be PUSCH, PUCCH, or SRS. In some cases, the PUSCH can be a codebook or a non-codebook-based transmission. In some implementations, the transmission can be repetitive or occasional.

In some implementations, the transmission scheme can include the UE transmitting a single uplink transmission occasion of the TB with each spatial relation associated with a non-overlapping frequency domain resource allocations (e.g., FDM scheme). In some implementations, an occasion may correspond to a spatial relation. In some implementations, UE can be scheduled to simultaneously transmit the uplink transmission occasions of the TB allocated in different non-overlapping frequency domain resources. In some implementations, the number of both different spatial relations and different non-overlapping frequency domain resource allocations can be two. In some implementations, the number of SRS resource sets for the uplink transmissions can be two.

In some implementations, the two non-overlapping frequency domain resource allocations can be wide-band or sub-band based precoding. In this case, the precoding of the two non-overlapping frequency domain resource allocations can be determined by DCI indication and/or MAC CE activation and/or RRC configuration. In some implementations, the RRC configuration can be the higher layer parameter(s) which may be used to indicate wide-band or sub-band based precoding of the two non-overlapping frequency domain resource allocations.

In some implementations, the RRC configuration may be the higher layer parameter(s) used to configure a set of the active UL bandwidth parts, where each of the UL bandwidth parts can be indicated by the frequency domain resource assignment field in DCI. In some implementations, the MAC CE activation can be used to indicate a set of the active UL bandwidth parts that each of the UL bandwidth parts can be indicated by the frequency domain resource assignment field in DCI.

In some cases, the DCI indication can be the field with 2 bits in DCI used to indicate the uplink transmissions associated with one or two SRS resource sets with respective spatial relations. For example, one value of the field (e.g., "10") can be used to indicate the non-overlapping frequency domain resource allocations are wide-band based precoding. In some other cases, the first and second SRI/TPMI fields in DCI used to the SRS resource sets may be configured with lower and higher indexes/IDs, respectively. For example, one value of the field (e.g., "11") can be used to indicate the non-overlapping frequency domain resource allocations are sub-band based precoding. In some other cases, the first and second SRI/TPMI fields in DCI used to the SRS resource sets may be configured with lower and higher indexes/IDs, respectively.

In some implementations, the association between spatial relation and non-overlapping frequency domain resource allocation can be indicated by the DCI field and/or configured by RRC signaling. In some cases, if the uplink transmission is PUSCH, the association can be indicated by different SRI fields in DCI. In some cases, if the uplink transmission is PUSCH, the association can be determined by two SRS resource sets configured by RRC for the PUSCH transmissions.

In some implementations, the RRC configuration can be a higher layer parameter set to a specific value corresponding to an uplink transmission scheme. For example, the higher layer parameter pusch-RepTypeIndicatorDCI-0-1-r16 can be set to 'FDMSchemeA'. In another example, the higher layer parameter pusch-RepTypeIndicatorDCI-0-2-r16 can be set to 'FDMSchemeA'. In some implementations, the field with 2 bits in DCI used to indicate the uplink transmissions associated with one or two SRS resource sets with respective spatial relations can be set as "10" or "11". In some implementations, the DCI field "Antenna Port(s)" can indicate the UE with DM-RS port(s) for the uplink transmissions within at least two CDM groups.

In some implementations, Table 3 lists the SRS resource set(s) and SRI/TPMI associated with the respective codepoint (e.g. 2 bits of the field in DCI) which can be used to indicate STRP/MTRP dynamic switching when using FDM scheme in MTRP operation. For example, the SRS resource set with lower ID can be the first SRS resource set, and other SRS resource sets can be the second SRS resource set.

TABLE 3

| Codepoint | SRS resource set(s) | SRI (for both CB and NCB)/TPMI (CB only) field(s) |
|---|---|---|
| 00 | s-TRP mode with $1^{st}$ SRS resource set (TRP1) | $1^{st}$ SRI/TPMI field ($2^{nd}$ field is unused) |
| 01 | s-TRP mode with $2^{nd}$ SRS resource set (TRP2) | $1^{st}$ SRI/TPMI field ($2^{nd}$ field is unused) |
| 10 | m-TRP mode with wideband precoding $1^{st}$ SRI/TPMI field: $1^{st}$ SRS resource set $2^{nd}$ SRI/TPMI field: $2^{nd}$ SRS resource set | Both $1^{st}$ and $2^{nd}$ SRI/TPMI fields |
| 11 | m-TRP mode with sub-band precoding $1^{st}$ SRI/TPMI field: $1^{st}$ SRS resource set $2^{nd}$ SRI/TPMI field: $2^{nd}$ SRS resource set | Both $1^{st}$ and $2^{nd}$ SRI/TPMI fields |

Figure 9:
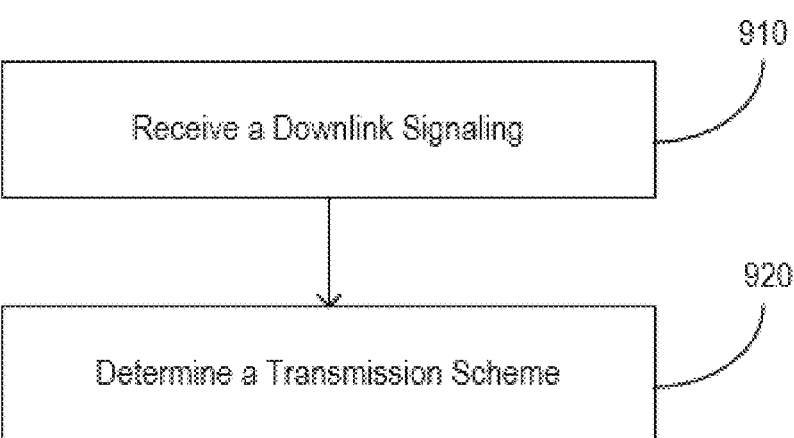

FIG. 9 illustrates a flow diagram of an example method 900 for uplink transmission scheme in MTRP operation. The method 900 may be implemented using any of the components and devices detailed herein in conjunction with at least FIGS. 1-7. In overview, the method 900 can include receiving a downlink signaling (910). The method 900 can include determining a transmission scheme (920).

Referring to operation (910), and in some implementations, a wireless communication device (e.g., UE) can receive a downlink signaling from a wireless communication node (e.g., BS or TRP). The downlink signaling can include a field indicating whether one or two spatial relations are associated with the various uplink transmissions to the wireless communication node. One spatial relation can correspond to one TRP for uplink transmission. Referring to operation (920), the wireless communication device can determine, based on the field of the DCI, a transmission scheme for the uplink transmissions. The procedures/process for the wireless communication device to determine the transmission scheme can be described herein and at least in conjunction with FIG. 8 and the example implementations 1-8, for example.

In some implementations, a first bit and a second bit of the field can be indicated as "00" or "01." In this case, the wireless communication device can determine that the transmission scheme includes sending the uplink transmissions as a single uplink transmission occasion of a Transport Block (TB) using one of the spatial relations. By having the first bit and the second bit of the field indicated as "00" or "01," the wireless communication device can further perform features or functionalities of, e.g., example implementation 1.

In some implementations, the first bit and the second bit may be indicated as "10" or "11". In this case, the wireless communication device can determine that the transmission scheme includes sending the uplink transmissions as a single uplink transmission occasion of a TB using each of the spatial relations that is associated with a respective one of various groups of transmission layers (e.g., sometimes referred to as groups of transmission modes). The wireless communication device may simultaneously send, to the wireless communication node, multiple uplink transmissions (e.g., repetition transmission) using the respective spatial relations, for example. In this cases, the number of spatial relations may be 2 and the number of the groups of transmission layers may be 2. Further, an association between one of the spatial relations and one of the plurality of groups of transmission layers may be indicated by the DCI signaling (e.g., downlink signaling) and/or an RRC configuration. In some cases, the downlink signaling can indicate that one or more Demodulation Reference Signal (DM-RS) ports configured for the uplink transmissions are within at least two Code Division Multiplexing (CDM) groups. In this case, the wireless communication device can perform features or functionalities similar to/in addition to example implementation 2.

In some implementations, the first bit and the second bit of the field may be indicated as "10" or "11," and the wireless communication device may determine/identify that the transmission scheme includes sending the uplink transmission as a single uplink transmission occasion of a TB using each of the spatial relations that is associated with a respective one of a plurality of non-overlapping frequency domain resource allocations. In this case, the wireless communication device can simultaneously send various uplink transmissions to the wireless communication node using non-overlapping frequency domain resource allocations, respectively. The number of the spatial relations can be 2, and a number of the plurality of non-overlapping frequency domain resource allocations can be 2. An association between one of the spatial relations and one of the plurality of non-overlapping frequency domain resource allocations may be indicated/specified/introduced by a DCI indication and/or an RRC configuration. In some cases, the downlink signaling may include/indicate a higher layer parameter (e.g., variable, metric, criterion, etc.) configured as a specific value to indicate the transmission scheme (e.g., pusch-RepTypeIndicatorDCI-0-1-r16 set to 'FDMSchemeA' or pusch-RepTypeIndicatorDCI-0-2-r16 set to 'FDMSchemeA'). In some cases, the downlink signaling may indicate that one or more DM-RS ports configured/set/modified for the uplink transmission are within one CDM group. In this case, the wireless communication device can perform features or functionalities similar to/in addition to example implementation 3.

In some implementations, with a first bit and a second bit of the field indicated as "10" or "11," the wireless communication device can determine that the transmission scheme includes sending/transmitting/communicating the uplink transmission as multiple uplink transmission occasions of a TB using each of the spatial relations that is associated with one of the uplink transmission occasions. The uplink transmission occasions may each have a corresponding one of various non-overlapping frequency domain resource allocations (e.g., each occasion have a corresponding non-overlapping frequency domain resource allocation with respect to another uplink transmission occasion). The wireless communication device can simultaneously send the uplink transmissions (e.g., uplink transmission occasions) using the non-overlapping frequency domain resource allocations, respectively. In this case, the number of the spatial relations may be 2, and the number of the plurality of uplink transmission occasions may be 2. An association between one of the spatial relations and one of the non-overlapping frequency domain resource allocations may be indicated by a DCI indication and/or an RRC configuration. In some cases, the downlink signaling can include a higher layer parameter configured as a specific value to indicate the transmission scheme (e.g., pusch-RepTypeIndicatorDCI-0-1-r16 set to 'FDMSchemeB' or pusch-RepTypeIndicatorDCI-0-2-r16 set to 'FDMSchemeB'). The downlink signaling may indicate that one or more DM-RS ports configured for the uplink transmission are within one CDM group. In this case, the wireless communication device can perform features or functionalities similar to/in addition to example implementation 4.

In some implementations, with a first bit and a second bit of the field indicated as "00" or "01," the wireless communication device can determine that the transmission scheme includes sending the uplink transmissions as multiple slot level uplink transmission occasions of a TB using/with one spatial relation. The association between the spatial relation and the slot level uplink transmission occasions may be indicated by a DCI indication and/or an RRC configuration. The downlink signaling can include a higher layer parameter configured as a specific value to indicate the transmission scheme. For example, the value pusch-RepTypeIndicatorDCI-0-1-r16 can indicate/set to 'pusch-RepTypeA' or the value pusch-RepTypeIndicatorDCI-0-2-r16 can be set to 'pusch-RepTypeA'. In further example, downlink signaling may indicate that one or more DM-RS ports configured for the uplink transmissions are within one CDM group. In this case, the wireless communication device can perform features or functionalities similar to/in addition to example implementation 5.

In some implementations, with a first bit and a second bit of the field indicated as "10" or "11," the wireless communication device can determine that the transmission scheme includes sending the uplink transmissions as multiple slot level uplink transmission occasions of a TB using multiple spatial relations. The number of the plurality of spatial relations may be 2, for instance. An association between one of the spatial relations and one of the slot level uplink transmission occasions can be indicated by a DCI indication and/or an RRC configuration. The downlink signaling can include a higher layer parameter configured as a specific value to indicate the transmission scheme (e.g., pusch-RepTypeIndicatorDCI-0-1-r16 is set to 'pusch-RepTypeA', pusch-RepTypeIndicatorDCI-0-2-r16 is set to 'pusch-Rep-TypeA,' or the higher layer parameter pusch-Aggregation-Factor is set to one of {n2, n4, n8}). In this case, the downlink signaling can indicate that one or more DM-RS ports configured for the uplink transmissions are within at least two CDM groups. Further, in this case, the wireless communication device can perform features or functionalities similar to/in addition to example implementation 6.

In some implementations, with a first bit and a second bit of the field indicated as "00" or "01," the wireless communication device can determine that the transmission scheme includes sending the uplink transmissions as multiple intra-slot level uplink transmission occasions of a TB using one of the spatial relations that is associated with one of various intra-slot level uplink transmission occasions. In this case, the uplink transmission occasions may each have a corresponding one of various non-overlapping time domain resource allocations. The association between the spatial relations and the non-overlapping time domain resource allocations can be indicated by a DCI indication and/or an RRC configuration. The number of the intra-slot level uplink transmission occasions may be 2. Further, the downlink signaling may include a higher layer parameter configured as a specific value to indicate the transmission scheme (e.g., pusch-RepTypeIndicatorDCI-0-1-r16 is set to 'pusch-Rep-TypeB', pusch-RepTypeIndicatorDCI-0-2-r16 is set to 'pusch-RepTypeB', or pusch-AggregationFactor is set to one of {n2, n4, n8}). The downlink signaling can indicate that one or more DM-RS ports configured for the uplink transmissions are within one CDM group. Further, in this case, the wireless communication device can perform features or functionalities similar to/in addition to example implementation 7.

In some implementations, with a first bit and a second bit of the field indicated as "10" or "11," the wireless communication device can determine that the transmission scheme includes sending the uplink transmissions as multiple uplink intra-slot level transmission occasions of a TB using one of the spatial relations that is associated with one of various intra-slot level uplink transmission occasions. For example, the uplink transmission occasions may each have a corresponding one of a plurality of non-overlapping time domain resource allocations. A number of the spatial relations may be 2, and a number of the uplink intra-slot level transmission occasions may be 2. Further, an association between one of the multiple spatial relations and one of the non-overlapping time domain resource allocations can be indicated by a DCI indication and/or an RRC configuration. In this example, the downlink signaling can include a higher layer parameter configured as a specific value to indicate the transmission scheme (e.g., pusch-RepTypeIndicatorDCI-0-1-r16 is set to 'pusch-RepTypeB', pusch-RepTypeIndicatorDCI-0-2-r16 is set to 'pusch-RepTypeB', or pusch-AggregationFactor is set to one of {n2, n4, n8}). Further, the downlink signaling may indicate that one or more DM-RS ports configured for the uplink transmissions are within at least two CDM groups. In this case, the wireless communication device can perform features or functionalities similar to/in addition to example implementation 8.

In some implementations, the downlink signaling may at least include a DCI indication and an RRC configuration. Further, the RRC configuration can include a higher layer parameter configured as one of the specific values (e.g., aforementioned values of at least one of the example implementations) to indicate the transmission scheme. In this case, a first bit and a second bit of the DCI indication may be indicated as "00" or "01" to indicate the one Sounding Reference Signal (SRS) resource set is associated with the uplink transmissions. Additionally, the first bit and the second bit of the DCI indication may be indicated as "10" or "11" to indicate that two SRS resource sets are associated with the uplink transmissions. These implementations can include features or functionalities similar to/in addition to example implementation 9, for example.

In some implementations, the downlink signaling can at least include a DCI indication, a Medium Access Control (MAC) Control Element (CE) activation, and an RRC configuration. The RRC configuration can include a higher layer parameter configured as one of the specific values (e.g., mentioned above) to indicate the transmission scheme. The MAC CE activation can indicate that more than two SRS resource sets are associated with the uplink transmissions. In these implementations, for example, a first bit and a second bit of the DCI indication can be indicated/set/configured as "00" or "01" to indicate that one SRS resource set is associated with the uplink transmissions, and the first bit and the second bit of the DCI indication can be indicated as "10" or "11" to indicate that two SRS resource sets are associated with the uplink transmissions. As an example, these implementations can include features or functionalities similar to/in addition to example implementation 10.

In some implementations, with a first bit and a second bit of the field indicated/set/configured as "10" or "11," the wireless communication device can determine that the transmission scheme includes sending the uplink transmissions as a single uplink transmission occasion of a TB using each of the spatial relations that is associated with a respective one of the groups of transmission layers. The wireless communication device can simultaneously send, to the wireless communication node, the uplink transmissions using the spatial relations, respectively. The number of the spatial relations may be 2, and the number of the groups of transmission layers may be 2. The respective numbers of transmission layers within the groups of transmission layers can be indicated by a DCI indication and/or an RRC configuration.

Further, and in some implementations, the RRC configuration can include a higher layer parameter to indicate the respective numbers of transmission layers within the groups of transmission layers. In some other implementations, the RRC configuration can include a higher layer parameter to indicate a combination of the numbers of transmission layers of the groups of transmission layers. In some cases, when the first bit and the second bit are indicated as "10," the DCI indication can indicate that the respective numbers of transmission layers within the groups of transmission layers are the same. In some implementations, the first SRS Resource Indicator/Transmit Precoder Matrix Indicator (SRI/TPMI) field and a second SRI/TPMI field of the DCI indication can indicate the SRS resource set configured with a lower index and the SRS resource set configured with a higher index, respectively. Additionally, when the first bit and the second bit are indicated as "11," the DCI indication can indicate that the respective numbers of transmission layers within the groups of transmission layers are different. In some cases, the first SRI/TPMI field and the second SRI/TPMI field of the DCI indication can indicate a first SRS resource set associated with higher transmission layers and a second SRS resource set associated with lower transmission layers, respectively. Further, the downlink signaling can indicate that one or more DM-RS ports configured for the uplink transmissions are within at least two CDM groups. As an example, these implementations can include features or functionalities similar to/in addition to example implementation 11.

In some implementations, when a first bit and a second bit of the field are indicated as "10" or "11," the wireless communication device can determine that the transmission scheme includes sending the uplink transmissions as a single uplink transmission occasion of a TB using each of the spatial relations that is associated with a respective one of various non-overlapping frequency domain resource allocations. In this case, the wireless communication device can simultaneously send, to the wireless communication node, the uplink transmissions using various non-overlapping frequency domain resource allocations, respectively. The number of the spatial relations can be 2, and the number of the non-overlapping frequency domain resource allocations can be 2, in this case. The non-overlapping frequency domain resource allocations may be based on wide-band precoding or sub-band precoding indicated by a DCI indication, and/or a MAC CE activation, and/or an RRC configuration. In some cases, the RRC configuration can include a higher layer parameter to indicate that the non-overlapping frequency domain resource allocations are based on wide-band precoding or sub-band precoding. In further cases, the RRC configuration can include a higher layer parameter to configure a set of sub-bands for the uplink transmissions. In this case, the DCI indication can include a field to indicate one of the set of sub-bands. In other cases, the MAC CE activation can configure a set of sub-bands for the uplink transmissions, where the DCI indication can include a field to indicate one of the set of sub-bands.

Further, in some implementations, when the first bit and the second bit are indicated as "10," the DCI indication can indicate that the plurality of non-overlapping frequency domain resource allocations are based on wide-band precoding. In this case, a first SRI/TPMI field and a second SRI/TPMI field of the DCI indication can indicate a first SRS resource set configured with a lower index and a second SRS resource set configured with a higher index, respectively. In another example, when the first bit and the second bit are indicated as "11," the DCI indication can indicate that the plurality of non-overlapping frequency domain resource allocations are based on sub-band precoding. In this case, the first SRI/TPMI field and a second SRI/TPMI field of the DCI indication can indicate a first SRS resource set configured with a lower index and a second SRS resource set configured with a higher index, respectively. Further, the downlink signaling can indicate that one or more DM-RS ports configured for the uplink transmissions are within at least two CDM groups. These implementations can include features or functionalities similar to/in addition to example implementation 12, for example. Accordingly, by using the features/functionalities/operations/techniques discussed herein, the wireless communication device can determine uplink transmission scheme in MTRP (e.g., to send uplink transmission to the wireless transmission node/TRP(s)), such as to enhance/improve/increase transmission (e.g., PUSCH, physical uplink control channel (PUCCH), or sounding reference signal (SRS)) performance, for example.

Figure 10:
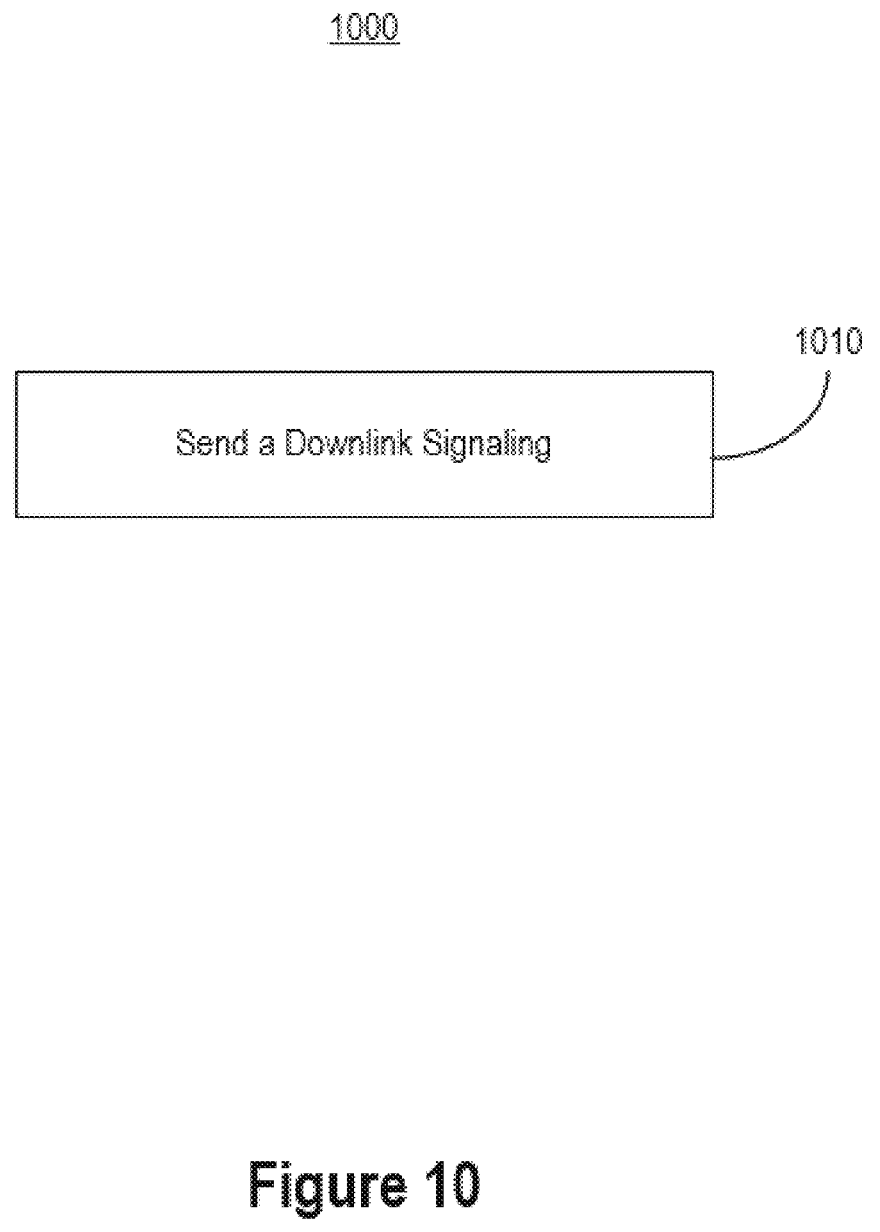

FIG. 10 illustrates a flow diagram of another example method 1000 for uplink transmission scheme in MTRP operation. The method 100 may be implemented using any of the components and devices detailed herein in conjunction with at least FIGS. 1-7. The method 1000 can include sending a downlink signaling (1010). For example, in operation (1010), the wireless communication node (e.g., BS or TRP) can send a downlink signaling (e.g., DCI) to the wireless communication device (e.g., UE). The downlink signal can include a field indicating whether one or two spatial relations are associated with uplink transmissions from the wireless communication device. With the downlink signaling including the field, the wireless communication device can determine the transmission scheme for the uplink transmissions (e.g., sending uplink transmission to the wireless communication node) based on the field. The wireless communication device can determine the transmission scheme using operations/features/functionalities/techniques similar to or as described in conjunction with at least FIGS. 1-9.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a 37 software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
   receiving, by a wireless communication device from a wireless communication node, a downlink signaling comprising a field indicating whether one or two spatial relations are to be used with a plurality of uplink transmissions to the wireless communication node, the downlink signaling indicating that one or more Demodulation Reference Signal (DM-RS) ports configured for the plurality of uplink transmissions are within at least one Code Division Multiplexing (CDM) group;
   determining, by the wireless communication device, based on the field, a transmission scheme for the plurality of uplink transmissions using the one or more DM-RS ports within the at least one CDM group; and
   sending, by the wireless communication device, at least one of the plurality of uplink transmissions in accordance with the transmission scheme.

2. The method of claim 1, wherein a first bit and a second bit of the field are indicated as "00" or "01," and the method further comprises:
   determining, by the wireless communication device, that the transmission scheme includes sending the plurality of uplink transmissions as a single uplink transmission occasion of a Transport Block (TB) using one of the one or two spatial relations.

3. The method of claim 1, wherein a first bit and a second bit of the field are indicated as "10" or "11," and the method further comprises:

determining, by the wireless communication device, that the transmission scheme includes sending the plurality of uplink transmissions as a single uplink transmission occasion of a Transport Block (TB) using each of the one or two spatial relations that is associated with a respective one of a plurality of groups of transmission layers.

4. The method of claim 3, wherein sending at least one of the plurality of uplink transmissions further comprises simultaneously sending, by the wireless communication device to the wireless communication node, the plurality of uplink transmissions using the respective spatial relations.

5. The method of claim 3, wherein at least one of: a number of the spatial relations is 2, or a number of the plurality of groups of transmission layers is 2.

6. The method of claim 3, wherein an association between one of the spatial relations and one of the plurality of groups of transmission layers is indicated by at least one of a Downlink Control Information (DCI) signaling or a Radio Resource Control (RRC) configuration.

7. The method of claim 3, wherein the downlink signaling further indicates that one or more DM-RS ports configured for the uplink transmissions are within at least two CDM groups.

8. The method of claim 1, wherein a first bit and a second bit of the field are indicated as "10" or "11," and the method further comprises:

determining, by the wireless communication device, that the transmission scheme includes sending the plurality of uplink transmission as a single uplink transmission occasion of a Transport Block (TB) using each of the spatial relations that is associated with a respective one of a plurality of non-overlapping frequency domain resource allocations.

9. The method of claim 8, wherein sending at least one of the plurality of uplink transmissions further comprises simultaneously sending, by the wireless communication device to the wireless communication node, the plurality of uplink transmissions using the plurality of non-overlapping frequency domain resource allocations, respectively.

10. The method of claim 8, wherein a number of the spatial relations is 2, and a number of the plurality of non-overlapping frequency domain resource allocations is 2.

11. The method of claim 8, wherein an association between one of the spatial relations and one of the plurality of non-overlapping frequency domain resource allocations is indicated by at least one of a downlink control information (DCI) indication or a radio resource control (RRC) configuration.

12. The method of claim 8, wherein the downlink signaling includes a higher layer parameter configured as a specific value to indicate the transmission scheme.

13. The method of claim 8, wherein the downlink signaling further indicates that one or more DM-RS ports configured for the uplink transmission are within one CDM group.

14. The method of claim 1, wherein a first bit and a second bit of the field are indicated as "10" or "11," the method further comprises:

determining, by the wireless communication device, that the transmission scheme includes sending the plurality of uplink transmissions as a plurality of uplink transmission occasions of a Transport Block (TB) using each of the spatial relations that is associated with one of the plurality of uplink transmission occasions, wherein the plurality of uplink transmission occasions each have a corresponding one of a plurality of non-overlapping frequency domain resource allocations.

15. The method of claim 14, further comprising:

simultaneously sending, by the wireless communication device to the wireless communication node, the plurality of uplink transmissions using the plurality of non-overlapping frequency domain resource allocations, respectively.

16. The method of claim 14, wherein at least one of: a number of the spatial relations is 2, or a number of the plurality of uplink transmission occasions is 2.

17. The method of claim 14, wherein an association between one of the spatial relations and one of the plurality of non-overlapping frequency domain resource allocations is indicated by at least one of a downlink control information (DCI) indication or a radio resource control (RRC) configuration.

18. A wireless communication method, comprising:

sending, by a wireless communication node to a wireless communication device, a downlink signaling comprising a field indicating whether one or two spatial relations are to be used with a plurality of uplink transmissions from the wireless communication device, the downlink signaling indicating that one or more Demodulation Reference Signal (DM-RS) ports configured for the plurality of uplink transmissions are within at least one Code Division Multiplexing (CDM) group; and causing, by the wireless communication node, the wireless communication device to (i) determine a transmission scheme for the plurality of uplink transmissions based on the field using the one or more DM-RS ports within the at least one CDM group and (ii) send at least one of the plurality of uplink transmissions in accordance with the transmission scheme.

19. A wireless communication device, comprising:

at least one processor configured to:

receive, via a receiver from a wireless communication node, a downlink signaling comprising a field indicating whether one or two spatial relations are to be used with a plurality of uplink transmissions to the wireless communication node, the downlink signaling indicating that one or more Demodulation Reference Signal (DM-RS) ports configured for the plurality of uplink transmissions are within at least one Code Division Multiplexing (CDM) group; and determine, based on the field, a transmission scheme for the plurality of uplink transmissions using the one or more DM-RS ports within the at least one CDM group; and send, via a transmitter, at least one of the plurality of uplink transmissions in accordance with the transmission scheme.

20. A wireless communication node, comprising:

at least one processor configured to:

send, via a transmitter to a wireless communication device, a downlink signaling comprising a field indicating whether one or two spatial relations are to be used with a signaling indicating that one or more with a plurality of uplink transmissions from the wireless communication device, the downlink signaling indicating that one or more Demodulation Reference Signal (DM-RS) ports configured for the plurality of uplink transmissions are within at least one Code Division Multiplexing (CDM) group;

cause the wireless communication device to (i) determine a transmission scheme for the plurality of uplink transmissions based on the field using the one or more DM-RS ports within the at least one CDM group, and (ii) send at least one of the plurality of uplink transmissions in accordance with the transmission scheme.

\* \* \* \* \*